United States Patent [19]

Hammack

[11] 3,953,856

[45] Apr. 27, 1976

[54] METHOD AND APPARATUS FOR MAPPING AND SIMILAR APPLICATIONS

[76] Inventor: Calvin Miles Hammack, P.O. Box 302, Saratoga, Calif. 95070

[22] Filed: Mar. 4, 1974

[21] Appl. No.: 448,071

Related U.S. Application Data

[63] Continuation-in-part of Ser. Nos. 296,321, Oct. 10, 1972, and Ser. No. 288,429, Sept. 19, 1972, Pat. No. 3,866,229, and Ser. No. 74,180, Sept. 21, 1970, Pat. No. 3,795,911, said Ser. No. 296,321, is a continuation-in-part of Ser. No. 86,770, Feb. 2, 1961, Pat. No. 3,706,096, said Ser. No. 288,429, is a continuation-in-part of Ser. No. 817,765, April 21, 1969, Pat. No. 3,691,560, which is a continuation-in-part of Ser. No. 420,623, Dec. 23, 1964, Pat. No. 3,445,847, said Ser. No. 74,180, is a continuation-in-part of Ser. No. 278,191, May 6, 1963, abandoned, and Ser. No. 86,770.

[52] U.S. Cl. .............................. 343/112 D; 343/7.7; 343/9; 343/10; 343/112 TC
[51] Int. Cl.² ................................................ G01S 3/02
[58] Field of Search .................... 343/7.5, 9, 10, 15, 343/112 D, 112 TC, 7.7

[56] References Cited

UNITED STATES PATENTS

| | | | |
|---|---|---|---|
| 2,403,626 | 7/1946 | Wolff et al. | 250/1 |
| 2,654,884 | 10/1953 | Palmer | 343/9 |
| 2,697,826 | 12/1954 | Dicke | 343/7.7 |
| 2,968,034 | 1/1961 | Cafarelli, Jr. | 343/112 |
| 3,120,000 | 1/1964 | Wilmotte | 343/113 |
| 3,155,971 | 11/1964 | Hansel | 343/12 |
| 3,212,091 | 10/1965 | Bissett et al. | 34/112 |
| 3,226,713 | 12/1965 | Sorkin et al. | 343/6.5 |
| 3,228,028 | 1/1966 | Baum et al. | 343/7.7 |
| 3,564,543 | 2/1971 | Nehama et al. | 343/15 |

Primary Examiner—Maynard R. Wilbur
Assistant Examiner—T. M. Blum
Attorney, Agent, or Firm—Victor R. Beckman

[57] ABSTRACT

This invention relates to an improvement in the art of position determination and in particular to the art of mapping, surveying, station keeping, and the like, employing moving craft and measuring quantities linearly related to the simultaneous variations of the simultaneous distances between the moving craft and a plurality of fixed or mobile station points.

49 Claims, 29 Drawing Figures

METHOD AND APPARATUS FOR MAPPING AND SIMILAR APPLICATIONS

CROSS REFERENCES TO RELATED APPLICATIONS

This is a continuation-in-part of copending patent application Ser. No. 296,321 filed Oct. 10, 1972, which patent application is in turn a continuation in-part of U.S. Pat. application Ser. No. 86,770 filed Feb. 2, 1961, now U.S. Pat. No. 3,706,096. The present application also is a continuation-in-part of copending application Ser. No. 288,429 filed 9-19-72, now U.S. Pat. No. 3866229, which in turn is a continuation-in-part of Ser. No. 817,765 filed 4-21-69, U.S. Pat. No. 3691560 which, in turn, is a continuation-in-part of Ser. No. 420,623 filed 12-23-64, U.S. Pat. No. 3445847. The present application is also a continuation-in-part of co-pending application Ser. No. 74180 filed 9-21-70 now U.S. Pat. No. 3795911 which is a continuation-in-part of application's Serial No. 278,191 filed 5-6-63 now abandoned and of Ser. No. 86,770 filed 2-2-61 now U.S. Pat. No. 3706096.

Related applications of the applicant include U.S. Pat. application Ser. No. 289,609, filed June 21, 1963, now U.S. Pat. No. 3,286,263, issued Nov. 15, 1966, entitled Polystation Detector for Multiple Targets and Ser. No. 420,623, filed Dec. 23, 1964, now U.S. Pat. No. 3,445,847, issued May 20, 1969 entitled Method and Apparatus for Geometrical Determinations.

INCORPORATION BY REFERENCE

The above-identified U.S. Pat. No. 3,706,096, co-pending U.S. Pat. application Ser. No. 74,180, filed Sept. 21, 1970, now U.S. Pat. No. 3,795,911, and co-pending U.S. Pat. application Ser. No. 296,321, filed Oct. 10, 1972 specifically are incorporated herein by reference.

SUMMARY OF THE INVENTION AND OBJECTS

The physical basis of the instant invention is a particular part of a more general domain of physical phenomena which I discovered, particular parts of which I have used as the bases of several other inventions. Some of these other inventions are described in the specifications of the referenced patent applications. In absurdedly few words this domain of physical phenomena, at least as it is relevant here, can be characterized somewhat as follows in terms of geometry:

A configuration of a sufficient number of points is entirely determined by a sufficient number of its static or temporal variations of suitable kind and of suitable combination.

The instant specification is only concerned with variations of the physical quantities with respect to time. (See U.S. Pat. No. 3,286,263 and U.S. Pat. No. 3,445,847 for particular systems not concerned with variation with respect to time.) In general the variation of a configuration of points comprises the variation of an indeterminate number of possible geometric parameters, which geometric parameters in sufficient combination define the configuration. One kind of parameters whose variations can be sensed in applications of my general invention as it is described above are angular. (My U.S. Pat. No. 3,445,847 describes systems and method of this type, based on angular variations, for the purpose of surveying, mapping, and the like.) In the instant specification I am only concerned with geometric parameters that are lineal in character. Lineal geometric parameters, or simply lineal parameters here, are defined for the purpose of this disclosure as being limited to any of the following geometric elements: the distance, or range, between two points; the sum of two such distances; the difference between two such distances; any other combination of such distances.

My instant invention can be used to determine the mutually relative positions of the stations of a multi-static system. In general these stations are fixed in position relative to each other. However, my invention may also be employed to determine the position-motion states of the stations relative to each other when there is relative motion between the stations and when the dimensions of that motion can be adequately defined. In either the case of fixed stations or stations in motion the object of the invention is carried out by performing measurements of the variations of lineal geometric parameters of the configuration of points associated with the stations and one or more objects (aircraft, spacecraft, missiles and the like) moving relative to the stations. In my invention such measurements are performed employing wave means and accordingly may be classified as doppler observations or doppler measurements.

In the practice of my invention it is not necessary to employ any equations of motion or other assumptions relative to the position-motion state. It is possible, in certain modes of my invention, to achieve certain advantages through the employment of practical assumptions relative to the position-motion state. Among these advantages, available under restricted circumstances, is the improvement of accuracy through the introduction of redundancy. Another advantage that similarly may be achieved in this way is the reduction in the number of stations required.

It is the principle object of my invention to provide a method and system for determining, relative to each other, the positions of points or stations of a multistatic system by using wave means at the several points to simultaneously measure quantities linearly dependent upon the variations of the distances between the points and a moving craft or other moving object. My invention can be employed to provide a new method of land surveying, the entire purpose of the use of the apparatus being to that end. My invention may also be used as a part of a system whose principle purpose is not land surveying but some other purpose such as aircraft navigation, missile tracking, and the like. My invention can be employed in such systems to determine the positions of separate fixed stations of the system relative to each other. Where my invention is used to perform such an ancillary function it is frequently possible to employ the same apparatus that performs the primary function of the system to perform at least a part of the ancillary surveying or mapping function as well. For instance the stations of a Polystation Dpppler system whose primary function and puruse is tracking missiles can also be employed in my instant invention to determine the positions of the stations of the system as well. In such an application the moving element may be one or more of the moving objects, shells, missile, which it is the primary purpose to track or it may be some special craft or missile sent into the field of the system for the specific purpose of my invention and/or otherwise calibrating the system.

In the practice of my invention it is unnecessary to know any of the dimensions of the position-motion state of any of the points of the particular geometrical configuration the variations of whose parameters are measured in order to determine parameters of the configuration, or to know dimensions of the position-motion state of any of the points comprised by the configuration. This is to say in essence that my invention has in general a mapping capability. Thus it is that a wide area of application is made available for exploitation of my basic invention. Not only is the practical use of my invention free from reliance on mechanical surveying techniques but the invention can be used as a surveying tool. This mapping function of my basic invention was set forth in my U.S. Pat. application No. 278,191 filed May 6, 1963. This text is made a part hereof by incorporation by reference of my U.S. Pat. application Ser. No. 74,180, filed Sept. 21, 1970.

This specification is concerned with those applications of my basic invention which are dynamic in character as distinct from those applications such as are set forth in my U.S. Pat. No. 3,286,263, re lineal systems. Mapping is also described in my U.S. Pat. No. 3,445,847 where angular measurements, both static and dynamic, are described.

As in those embodiments of my invention in which it is the prime purpose to determine elements of the position-motion state of a moving object relative to a plurality of stations whose positions are known, some embodiments of my surveying methods employ incremental type measurements and other embodiments employ rate type measurements.

BRIEF DESCRIPTION OF DRAWINGS

Referring to the drawings briefly.

THE POSITION MOTION STATE

"Position-Motion State" is described in the referenced U.S. Pat. No. 3,445,847. See Column 4.

While the position-motion state may be fully defined in terms of non-orthogonal dimensions as in a system of hyperbolic coordinates it is generally more useful to apply dimensions of the position-motion state in terms of a set of orthogonal dimensions. Spherical coordinates, cylindrical coordinates, and cartesian coordinates are samples of orthogonal coordinate systems the dimensions of which in terms of position, velocity, acceleration, jerk, and accelerations of higher order can be employed to fully define the position-motion state.

In some modifications of my invention the positions of a series of significant points along the path of the moving object defines the dimensions of the position-motion state of the moving object. In some of these modifications it is desired to convert these dimensions defining the position motion state to the dimensions of position, velocity, acceleration, jerk, etc. This conversion is directly performable in automatic computation apparatus employing algorithm derived from the geometric time series.

$$x(t) = a_0 + a_1 t + a_2 t^2 + a_3 t^3 \ldots \text{ or}$$
$$x_j = a_0 + a_1 j + a_2 j^2 + a_3 j^3 \ldots$$

By employing the proper number of such equations and performing the simultaneous solution process one obtains the coefficients $a$ from which are directly derived the velocity, acceleration, jerk, etc.

$a_1$ is the speed along the $x$ axis $2a_2$ is the acceleration along the $x$ axis $6a_3$ is the jerk along the $x$ axis and so forth.

Similar procedures exist for use in other coordinate systems.

MULTIPLE RATE FINDERS

Figure 1:
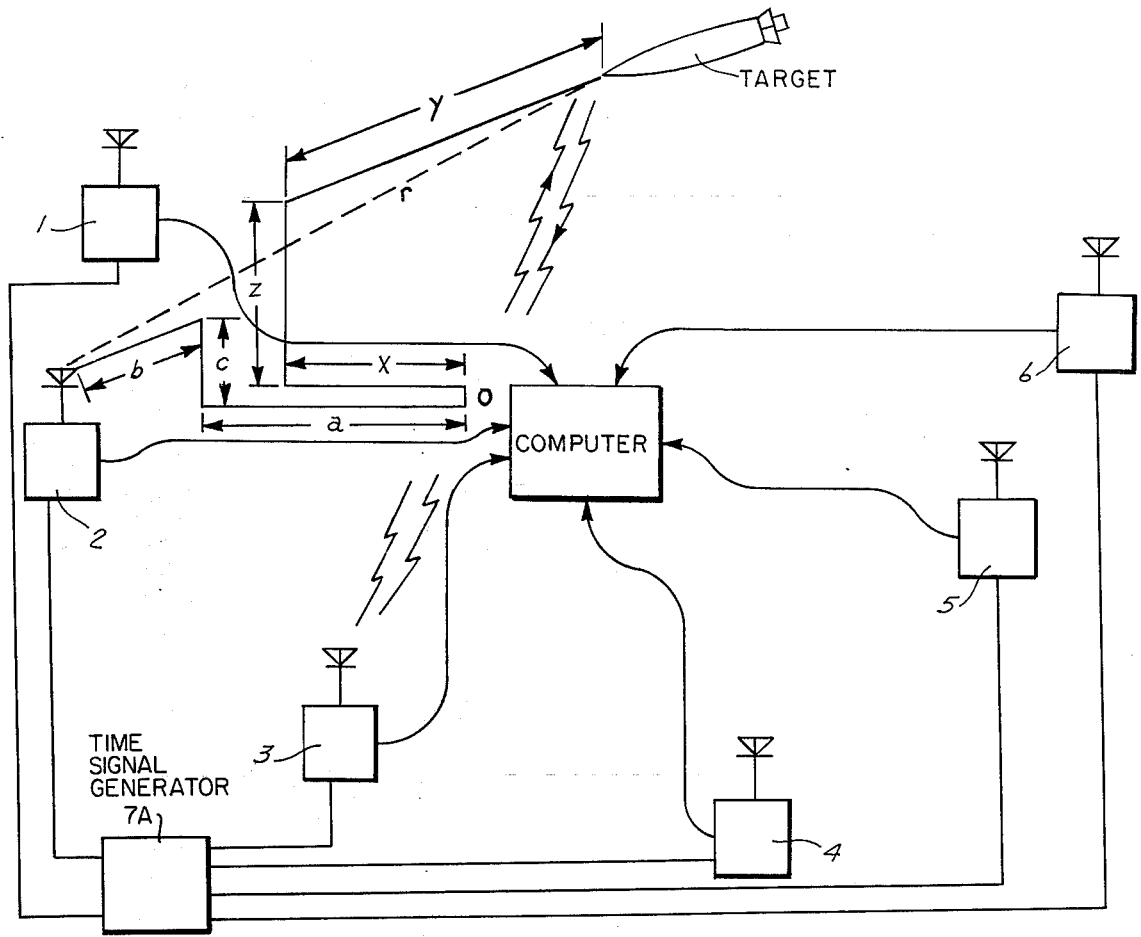
FIG. 1 is a schematic diagram showing a single legged reflective system.

A practical embodiment of my invention, shown in FIG. 1, is a simple system designed to track a single aircraft or space vehicle without relying on equipment placed aboard the vehicle.

Each of the stations 1–6 is identical to the others and consists of a transmitter to illuminate the target and a receiver tuned so as to receive signals reflected to it from the target. The receiver of a particular station is tuned to receive signal frequencies that are near but not equal to the frequency of the corresponding transmitter. Each of these stations is adjusted to its own operating signal frequency so as to prevent the reception of signals transmitted by one station of the group by the receiver of another station of the group. Each station then makes a completely independent measurement of radial velocity with reference to the missile or target simultaneously with the other five stations of the system. The measured radial velocity is then transmitted by each station to a central point where the position and velocity of the vehicle at the time of the measurements is calculated by computer 7.

Figure 2:
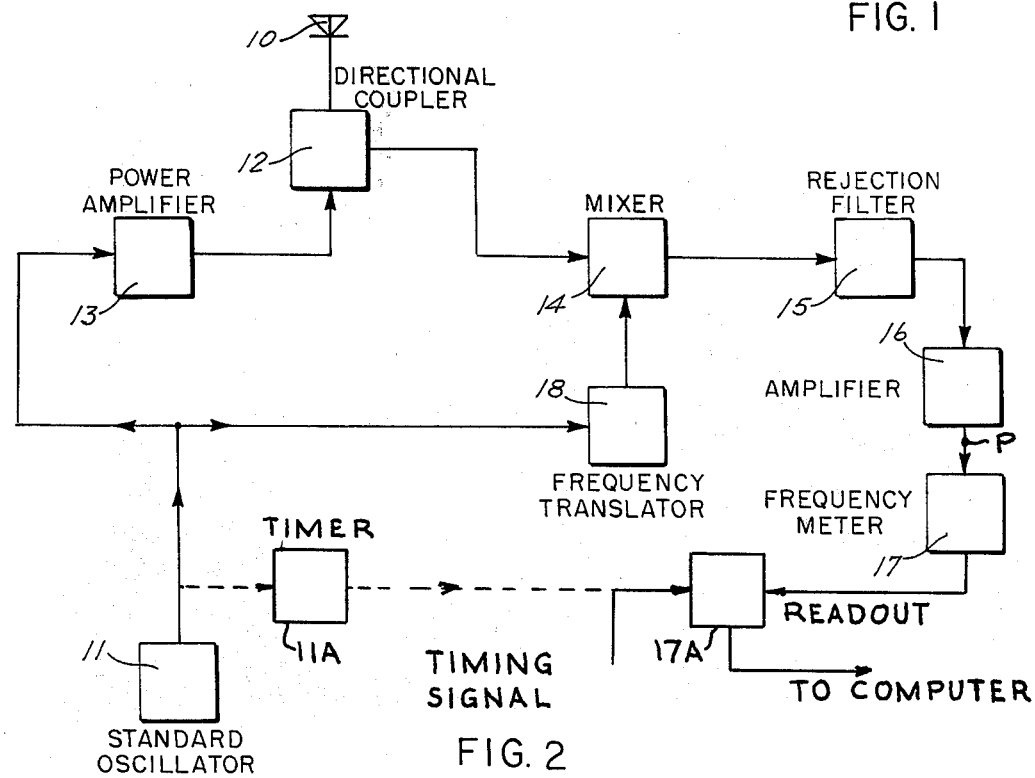
FIG. 2 is a schematic drawing of a radial velocity measuring station.

In FIG. 2 there is shown a diagram of connections for one of the six stations shown in FIG. 1 and each of the stations 1 to 6, inclusive, is connected as shown in FIG. 2. It is seen that the transmitter and the receiver share some elements of their respective systems namely, the antenna 10 and the local standard oscillator 11, which may be a piezoelectric crystal controlled oscillator or any other type of frequency stabilized oscillator. The use of a common oscillator 11 for both transmitter and receiver effectively eliminates the effects of small frequency drifts which might occur in the oscillator frequency and thereby improves the practical precision with which the fundamental measurement is made. The transmitter and the receiver are coupled to the single antenna 10 by a directional coupler 12 which is well known in the art, so that the receiver is protected from the power of the transmitter.

A diode mixer 14 is connected to the received signal output of the directional coupler 12. The diode mixer 14 also receives a signal from the frequency translator 18 which is connected to the oscillator 11 and translates the frequency of the signal supplied to the mixer 14 by the oscillator 11 as will be described further under the operation of this circuit. The output of the mixer 14 is fed to the rejection filter 15 which is tuned to reject signals of undesired frequencies such as the signal produced by the mixing of the transmitter signal and the mixing signal. Other signals of constant frequency may also be eliminated by this filter. The output of the filter 15 is amplified by the amplifier 16 and the amplified output is fed to the frequency meter 17.

The radial velocity of the target from the station is a component of the target's velocity in the direction of the station and is related to the doppler frequency shift in the following manner:

$$V = \frac{(f_o - f_e)}{(f_o + f_e)} C$$

where:

V is the radial velocity away from the station
$f_o$ is the frequency of the radiated signal
$f_e$ is the frequency of the reflected signal
C is the velocity of light
$\pm |f_o - f_e|$ is the frequency shift owing to the motion of the reflector in the direction of the station. The upper sign applies if the target is approaching the station. The lower sign applies if the target is receding from the station.

For each station may be written the well known equation relating the slant range from the target to the station and the cartesian coordinates of the target. Each of these equations may be differentiated with respect to time to attain a new and independent equation for each differentiation. Thus twelve equations are available whose simultaneous solution yields twelve unknowns. The equations are:

$$r_i^2 = (x - a_i)^2 + (y - b_i)^2 + (z - c_i)^2$$
$$r_i \dot{r}_i = (x - a_i) \dot{x} + (y - b_i) \dot{y} + (z - c_i) \dot{z}$$

Where:

$a_i, b_i, c_i$ are the cartesian coordinates of the $i^{th}$ station and are known and constant. The twelve unknowns are the slant ranges $r_1, r_2, r_3, r_4, r_5$, and $r_6$, the three cartesian coordinates of the target, $x, y$, and $z$, and the time derivatives of the coordinates $\dot{x}, \dot{y}$, and $\dot{z}$. The time derivatives of the slant ranges are measured and therefore known, $\dot{r}_1, \dot{r}_2, \dot{r}_3, \dot{r}_4, \dot{r}_5, \dot{r}_6$. There are thus twelve independent equations that are solved simulataneously to determine not only the position of the vehicle but also its velocity.

Simultaneity of measurement is achieved in some embodiments of my invention by transmitting a timing signal from time signal generator 7A in FIG. 1. A readout 17A, FIG. 2, connected to element 17 is actuated by the timing signal simultaneously at all stations. In other embodiments timing means 11A driven by element 11 controls the operation of the readout 17A. Timer 11A can be set by prearrangement using broadcast time signals, transport of clocks, using the timing signal in FIG. 1, or by similar means. The frequency of element 11 can be adjusted similarly, but the measurement stability is guaranteed by the stability of the oscillator 11 itself at the station site.

WHEN THE STATION POSITIONS ARE UNKNOWN:

When the station positions are not known it is necessary that the system be operated in a mapping or "self surveying" mode. Of course this mapping mode may well be the primary purpose of the system, the determination of the position-motion state of the vehicle being entirely ancillary.

Since the station positions are not known, they must be determined simultaneously with the determination of the position-motion state of the moving vehicle. The unknown coordinates of the stations are added to the equation set along with the required additional equations. The additional equations are obtained through higher ordered differentiation of the range rate data as explained elsewhere in this specification. Each differentiation provides an additional equation relative to each station of the system.

In this manner any or all of the desired station point coordinates can be determined by the computer by solving the appropriate sets of simultaneous equations. At the time of the filing of U.S. Pat. applications Ser. Nos. 86,770 and 278,191 the market was replete with digital machine computers capable of easily performing the necessary mathematical functions. The general mathematical processes by which such sets of simultaneous equations are solved automatically in the computer were well known and widely practiced at the time of the filing of the U.S. Pat. application Ser. No. 86,770.

MULTIPLE DISPLACEMENT FINDERS

Figure 3:
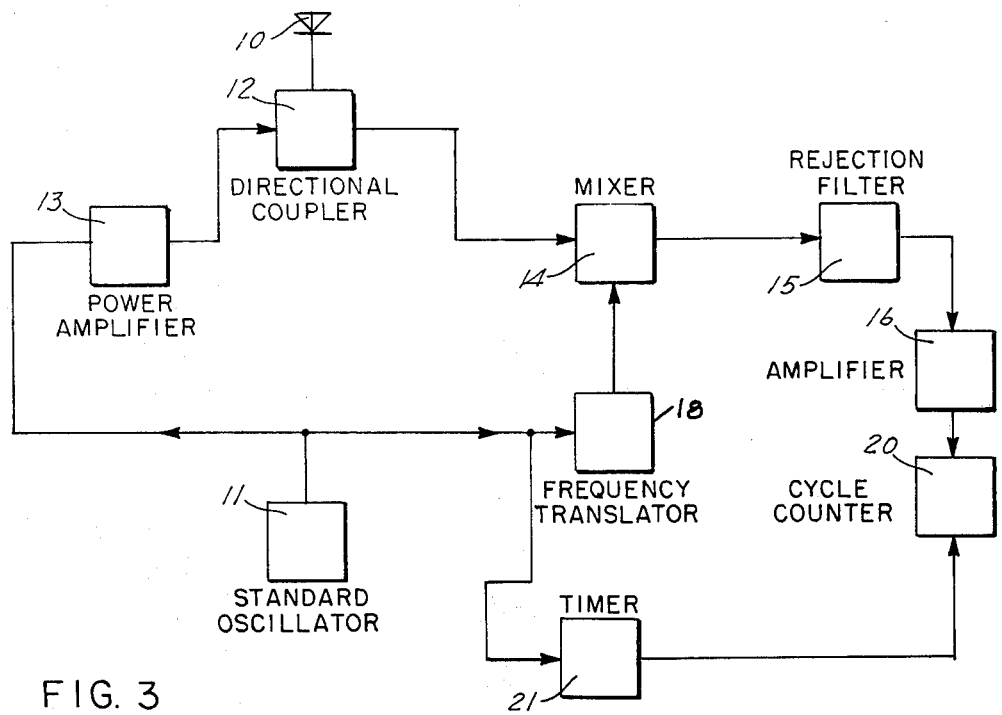
FIG. 3 is a schematic drawing of a radial displacement measuring station.

In an embodiment of my invention the measurement performed at each station is that of displacement of the target in the direction of the station. A finite increment of distance radial to the measuring station is measured. This displacement, positive or negative, occurs in a finite length of time and is a measurement of range difference, or change of range, of the target from a single station. The configuration of the system is shown in FIG. 1. The equipment arrangement is shown in FIG. 3. The radial displacement measuring station includes parts that are identical to those used in the radial velocity measuring station shown in FIG. 2 with the exception that the frequency meter 17 has been replaced by a cycle counter 20 and a timer 21. (It would be possible to employ a device for the integration of the radial velocity, but a preferred embodiment directly responsive to the change of phase is shown here.) The timer 21 determines the interval over which the cycle counter 20 counts the cycles of the signal by turning the counter on at the beginning of the predetermined interval and turning the counter off at the end of the interval. The timer 21 determines not only the duration of the count but the time of its initiation also. The timer 21 employs the standard oscillator 11 as the timing standard.

The timer 21 of each station is coordinated with the timers of the other stations by prearrangement. This procedure is possible and effective because timing between stations is not critical for targets of reasonable speed in my invention. This fact distinguishes in part this modification of my invention from hyperbolic systems such as Loran and elliptic systems such as Ordir. In these other systems timing is much more critical.

For each station of the system there may be written the well known equation relating the slant range from the station to the target and the cartesian coordinates of the target $$(x_1 - a_i)^2 + (y_1 - b_i)^2 + (z_1 - c_i)^2 = r_{i1}^2$$
$$(x_2 - a_i)^2 + (y_2 - b_i)^2 + (z_2 - c_i)^2 = r_{i2}^2$$

where:

$i = 1, 2, 3, 4, 5, 6$ $x_1, y_1, z_1$ are the cartesian coordinates of the location of the target at the time the measurement is initiated.

$x_2, y_2, z_2$ are the cartesian coordinates of the location of the target at the time the measurement is terminated.

$a_i, b_i, c_i$ are the cartesian coordinates of the $i$ th station.

$r_{i1}$ is the slant range from the $i$ th station to the target at the initiation of the measurement.

$r_{i2}$ is the slant range from the $i$ th station to the target at the termination of the measurement.

There is also the simultaneous equations resulting from the measurements as follows:

$$r_{i2} - r_{i1} = m_i$$

where:

$m_i$ is the range increment measured at the i th station.

There is one set of each of these three equations for each station resulting in a total of eighteen equations. There are eighteen unknowns, the three cartesian coordinates of the initial point, the thee cartesian coordinates of the final point, the six ranges from the stations to the initial point, and the six ranges from the stations to the final point. The simltaneous solution of these equations provides the values of the unknowns.

When the station locations are unknown

When any or all of the coordinates of the station locations are unknown the unknown coordinate or coordinates can be incorporated as unknowns in the equation set. Because of the additional unknowns more equations must be incorporated in the equation set which is to be solved. The additional equations may be acquired either by performing more measurements or by introducing equations representing the known physical facts relative to moving bodies. Such physical facts can be very general in character such as the knowledge that the vehicle moves continuously along a continuous path. On the other hand such physical facts can comprise specific trajectory or orbital information. Additional measurements can be obtained in two ways: taking more measurement sets with a given set of stations; employing more stations using the same number of measurement sets or readings.

My copending patent application Ser. No. 74,180, filed Sept. 21, 1970 incorporated in this specification by reference provides an extensive treatment of motion equations and how they are introduced into the equation set.

The number of stations required in the system may be reduced below the six shown by increasing the number of measurements performed per station or by introducing motion relationships or by by both procedures.

MULTIPLE DISPLACEMENT FINDERS WITH REVERSIBLE COUNTERS

Figure 4:
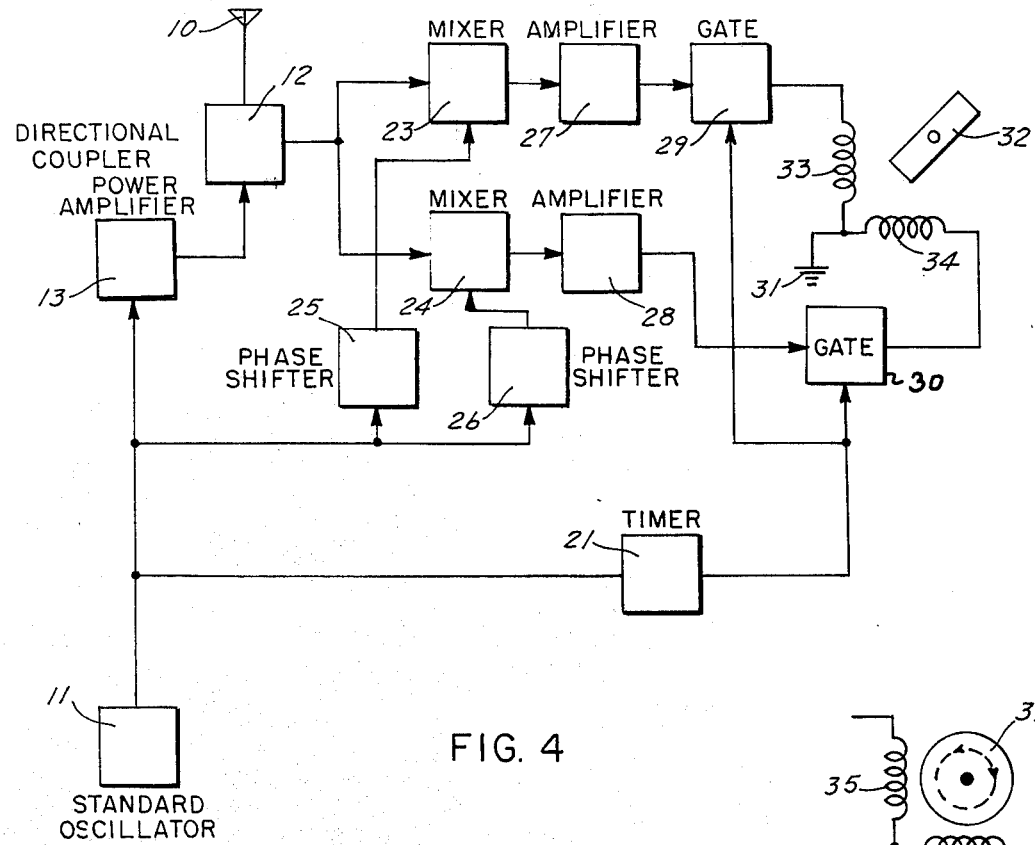
FIG. 4 is a schematic drawing of a measuring station provided with a reversible counter.

In this embodiment of my invention the measurement performed at each station is that of radial displacement toward or away from the measuring station. The configuration of the system is shown in FIG. 1. A schematic diagram of connections is shown in FIG. 4.

The local standard oscillator 11, determines the frequency of the radiated wave. The output of the local standard oscillator is amplified by the transmitter power amplifier 13, and is fed through the directional coupler 12 to the antenna 10 from which it is radiated. The signal is then reflected, with its frequency changed, by the moving target, reentering the antenna 10 and entering the receiver mixers 23 and 24 through the directional coupler 12. Since in this embodiment the mixing frequency is the same as the transmitted frequency it is necessary to employ two channels in the receiver in order to provide the system with a sense of direction.

Figure 4A:
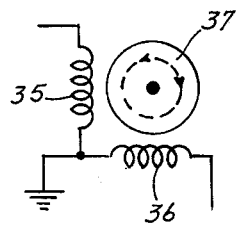
FIG. 4A is a fragmentary drawing showing a cathode ray tube used in the arrangement shown in FIG. 4.

The signal returning from the target and shifted in frequency by the doppler effect is fed into the diode mixers 23 and 24 along with two mixing signals of the radiation frequency which are ninety degrees out of phase with each other. These mixing signals are derived from the local standard oscillator 11 through phase shifting circuits 25 and 26. The outputs of the mixers 23 and 24 are amplified by low-pass amplifiers 27 and 28, which contain limiters so as to provide output signals of nearly constant amplitude. The outputs of the amplifiers 27 and 28 are fed into gates 29 and 30, respectively which are controlled from the timer 21 which is connected to the standard oscillator 11 to provide the timing signal. These gates under control of the timer 21 control the duration of the cycle count. The output of the gates 29 and 30 is a two-phase signal on three wires including the ground 31. The direction of rotation of this two-phase signal indicates whether the target is approaching or receding from the station. Each revolution of the signal is indicative of a change in the distance to the target of one-half wavelength of the transmitted wave. The change in range is then measured by noting the amount of rotation of this two-phase signal from the amplifiers. This operation may be performed electronically by supplying these signals to the magnetic deflection coils 35 and 36 of a cathode ray tube 37 as shown in FIG. 4A, so the beam of the cathode ray tube is rotated either clockwise or counter clockwise. However, a very satisfactory electromechanical device similar in all respects to a two-phase synchronous motor employing two windings 33 and 34 in space quadrature may be used in which the signal from one amplifier 27 is applied to the winding 33 and the signal from the other amplifier 28 is applied to the other winding 34. The rotor 32 of the motor consists of a small permanent magnet and the rotation of this magnet indicates the sense and the magnitude of displacement of the target from the station.

SUBMARINE DETECTION AND TRACKING

Figure 5:
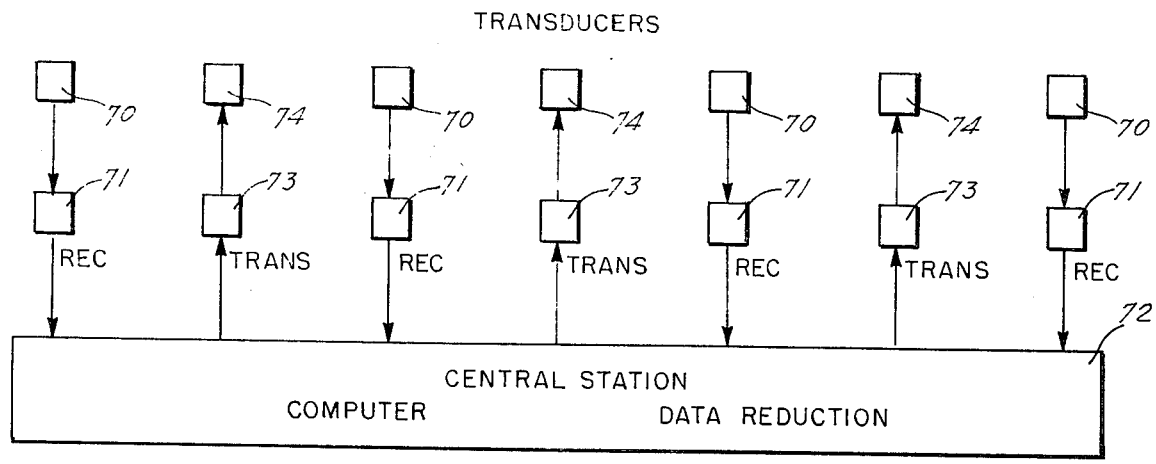
FIG. 5 is a diagram of a submarine detection system.

A practical embodiment of my invention is a system to detect the presence of a submarine by means of sonic waves. The system configuration comprises four receiving stations 71 each equipped with a transducer 70 for converting acoustic energy into electrical signals as shown in FIG. 5. The system also includes three transmitting stations 73 each equipped with a transducer 74 for transmitting acoustic signals. All of these stations are connected to the central station 72 containing the computer and data reduction apparatus. The receiving stations consist of electroacoustical transducers connected to amplification equipment. The transducers 70 and 74 may be affixed to the ocean bottom or anchored at certain depths.

Figure 6:
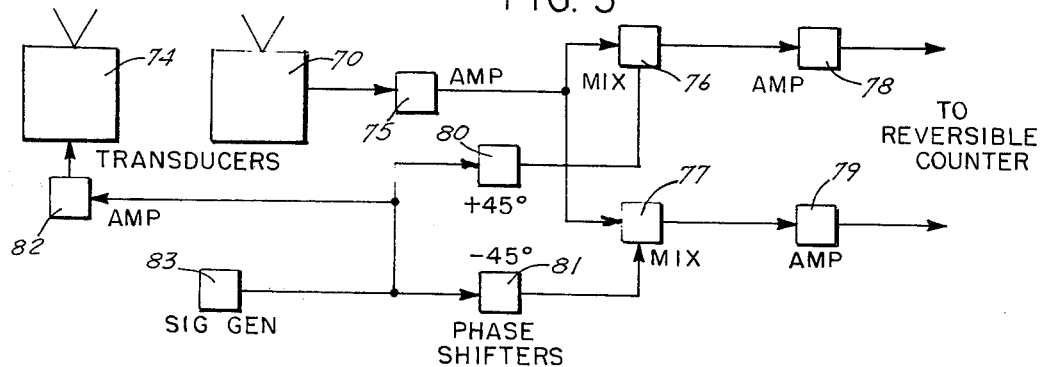
FIG. 6 is a schematic drawing of a submarine detection station.

Referring to FIG. 6, the doppler signals from receiver transducers 70 are amplified by the amplifier 75 and then fed to the mixers 76 and 77 which are also supplied with electrical oscillations from the phase shifters 80 and 81 respectively. The output of the generator 83 is supplied to the amplifier 82, which energizes the transmitting transducer 74, and to the phase shifters 80 and 81. Phase shifter 80 advances the phase by 45 degrees and phase shifter 81 retards it by 45 degrees so that the signals supplied to the mixers 76 and 77 are 90 degrees out of phase with each other. The outputs of the mixers are supplied to amplifiers 78 and 79. The outputs of these amplifiers are fed to a reversible counter as described in connection with FIG. 4 and FIG. 4A.

The mathematical process performed by the computer is described in my referenced patent application Ser. No. 86,770, now U.S. Pat. No. 3,706,096. Processes for echo grouping are set forth in my U.S. Pat. No. 3,270,340 for systems operating with multiple reflecting targets.

This system for detecting and tracking submarines is typical of those applications of my invention in which the ancillary function of determining the positions of the stations or transducers by ordinary surveying methods is difficult and in some instances impossible. If the stations or transducers are to be established at underwater locations the use of optical surveying methods and the conventional radio surveying methods is essentially precluded, as is measurement generally by chaining. In such circumstances the instant invention is of great value in permitting the determination of the station positions simultaneously with the determination of the position and track of a moving submarine target or torpedo target through the field of the system. It is not necessary to use any other system to determine the position of the moving vehicle or to steer it along any particular course. However for any particular geometrical deployment of the stations there are preferred courses which may be steered by the target vehicle in order to obtain a mapping or self-survey of the system of maximum accuracy in minimum time.

As described elsewhere in this application and the specification of U.S. Pat. application Ser. No. 74,180 included herein by reference, the process of position computation comprises the solution of a set of simultaneous equations, which set comprises as unknowns dimensions of the position-motion state of the target vehicle and the position coordinates of the stations, and comprises as known quantities the measured data.

MAPPING A SONARBUOY FIELD

In the use of aviation against submarines a common practice is to drop from the aircraft a field of radio equipped sonarbuoys on the surface of the sea over the volume of ocean suspected of harboring a hostile submarine. The sonarbuoy employs acoustic means to detect the submarine and transfers the detected signal to the aircraft by means of a radio transmitter in the buoy and a radio receiver in the aircraft. The effectiveness of this system in determining the position of the submarine depends in part upon the system in the aircraft having the position coordinates of the sonarbouys. It is particularly essential in some systems of this type that the positions of the buoys relative to each other be determined as exactly as possible in order to extract a maximum amount of information from the sonic function of the field of sonarbuoys.

The instant invention makes possible the very precise mapping of the sonarbuoy field employing radio apparatus in the aircraft and cooperative radio apparatus in the buoys. Using the radio apparatus, measurements are performed simultaneously of quantities linearly related to the variations of the simultaneous distances between the sonar buoys and the aircraft as the aircraft flies over the field of sonarbuoys or near it. The data resultant of the measurements is inserted into a computer which solves a set of simultaneous equations which set comprises as known quantities the measurement data and as unknown data the relative positions of the sonarbuoys and the aircraft, the aircraft position relative to the positions of the sonarbuoys, the sonarbuoy positions relative to one another and relative to the aircraft position.

The nature of the sonic operation of the sonarbuoy field is such as to be subject to implementation of a doppler method for the location of the submarine as described heretofore or as purely passive doppler method. Thus a polystation doppler sonic system can be employed in the water and another cooperative polystation doppler system used to map the field of sonarbuoys by radio means in the air over the water surface.

There is ample discussion in these pages of the radio apparatus that can be employed for the performance of the measurement of range variation and other well known methods and apparatus will at once occur to one skilled in the art. The radio apparatus in the buoy may be simply a reasonably stable C.W. transmitter operating in cooperation with a receiver in the aircraft. The radio apparatus in the sonarbuoy may be a transponder receiving C.W. signals from a transmitter in the aircraft and returning a signal to a receiver in the aircraft. The double doppler effect thus produced is discussed elsewhere in this specification.

Of course any type of wave form may be employed, one is not limited to C.W. Also as explaimed elsewhere in this specification the signal from the sonic apparatus of te sonarbuoy may be relayed to the aircraft through the same transmitter that is used in the mapping of the sonarbuoy field.

TRACKING SYSTEM EMPLOYING LIGHT PULSES

Figure 7:
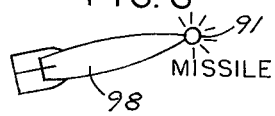
FIG. 7 is a diagram of a pulsed light tracking system.
Figure 7:
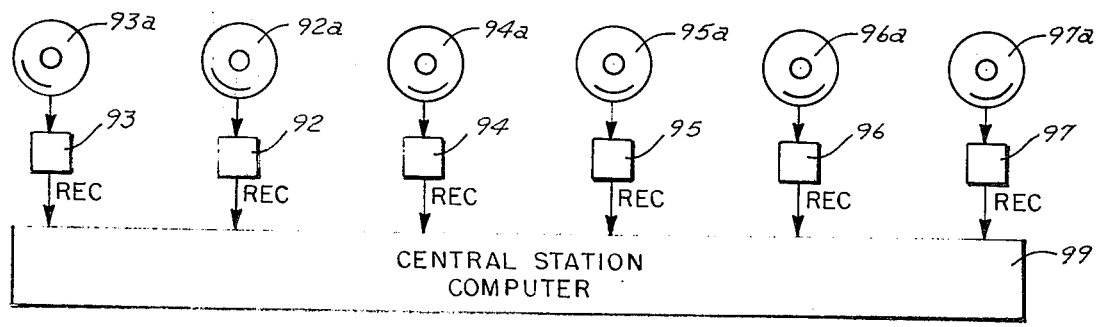

A practical embodiment of my invention is a system for the determination of the position and motion of a moving missile or vehicle which is emitting pulses of light at known intervals. The light so emitted is detected by photoelectric means. The layout of the system is shown in FIG. 7 in which the strobe type light 91 is mounted on the missile 98 and transmits short bursts of light energy at known time intervals. The light energy is received at separate ground receiving stations 92, 93, 94, 95, 96, and 97 which are arranged so that they can all view the missile 98 at the same time. These ground stations are provided with light responsive cells 92A, 93A, 94A, 95A, 96A and 97A respectively, for converting light signals to electrical signals. The outputs of all of the receiving devices 92-97 are connected to the computer 99. At each station the interval between successive pulses is measured. The difference in the time interval between the transmission of two pulses and the time interval between the reception of the two pulses is a direct measure of the velocity of the vehicle in the direction of the measuring station. This relationship may be expressed as follows:

$$r_2 - r_1 = C(T_m - T_o)$$

where:
- $(r_2 - r_1)$ is the change in range from the station occurring during the time interval between the two transmitted pulses.
- C is the velocity of light.
- $T_o$ is the time interval between transmission of pulses.
- $T_m$ is time interval between reception of pulses.

Figure 8:
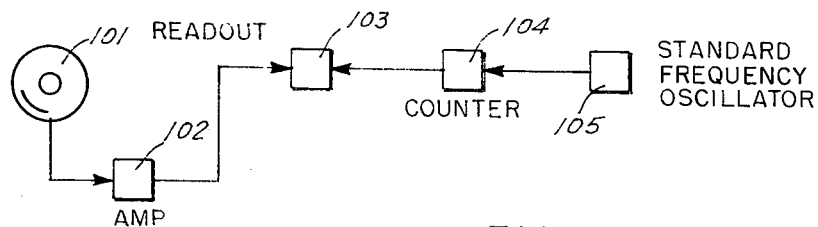
FIG. 8 is a schematic drawing of a pulsed light tracking station.

Each of the receiving stations is provided with instruments for measuring the time interval between the reception of the two pulses, and these instruments are connected as illustrated schematically in FIG. 8. The cell 101 emits an electric pulse each time there is a light pulse incident upon it. This electric pulse is amplified by pulse amplifier 102. The pulse signal from the pulse amplifier 102 is supplied to readout device 103 which is used to control the readout of counter 104. The local standard oscillator 105 provides a local time base for the station and the output of this oscillator is fed continuously into counter 104 which is in continuous operation. The count registered on the counter is read out by the readout 103 upon command given by the pulse of light received by the photocell 101. The counter 104 comprises a series of flip-flops, and no reset thereof is required as any given measurement is obtained by subtracting a previous reading from the last reading. A number of readout devices are available on the market which record the reading on the counter at the instant a readout signal is received. Thus the intervals between a single point and several consecutive points may be determined by subtracting from each of the successive readings after the first the value of the first reading. The intervals are of course time intervals, designated $T_m$ in the expression above.

There is no precise synchronization required between the stations. The only precise time standard is the independent frequency standard at each station. Only the time difference between epochs at each station is measured. These epochs are significant epochs and are the points in time during which the very narrow light pulses arrive at the photo cell and are detected thereby. It is assumed that the time between pulses is large compared to the time required for light to travel the distance of the range increment $(r_2 - r_1)$. The error involved in this assumption is in the ratio of the velocity of the vehicle to the velocity of light. The duration of the pulse is assumed to be small compared to the range increment.

The measurements of the separate stations are transmitted by land line or radio to the central station 99 where computations are made in accordance with procedures described elsewhere in this specification. Both single-reading and multiple reading methods may be employed.

This pulse wave method may also be applied to underwater sound operation.

This system employing light pulses is as much a doppler system as those systems described herein employing rate type measurements on continuous waves. This particular embodiment of my invention comprises the measurement of the change of range, or range change. The range change is a type of geometrical variation. The range change constitutes an incremental variation of a geometrical parameter, in this case a lineal parameter. The actual measurement cannot be performed in zero time, it requires a finite length of time to perform. In this particular embodiment of my invention the time required for the performance of an individual measurement of change of range is the time between pulses, and the range change measured is that range change which occurs during the interval between the epoch of initiating the measurement, i.e. the occurance of the first pulse, and the epoch of terminating the measurement, i.e. the occurance of the second pulse. A quantity that is linearly related to the change of range occuring in the interval of the measurement is measured. That measured quantity is the time interval between the epochs of initiation and termination of the measurement.

In this type of incremental doppler measurement one may view the roles of the separate elements of the measurement process to be reversed from the roles played by these elements in the familiar cycle counting method of performing the doppler measurement. In this particular embodiment the timing signal is actually transmitted by means of the radio waves and the measured quantity is the number of cycles of a locally generated signal. In the more familiar continuous wave systems, the timing signal is locally generated and it is the number of arriving waves that is counted. In either case the basic doppler principle of the measurement remains the same.

The measurements of the separate stations are transmitted by land line or radio to the central station 99 where computations are made in accordance with processes described elsewhere in this specification.

If the positions of the stations are known the processing at the central station comprises the solution of a set of simultaneous equations comprising as known values the coordinates of the stations and the measured quantities, and comprising as unknowns dimensions of the position-motion state of the moving vehicle. The output of the computing process may be the position coordinates of a number of points along the path of the moving vehicle or some other dimension such as velocity.

If the position coordinates of the stations are not known the system at the central station 99 may be arranged as, described elsewhere in this specification and the referenced specifications, to provide, internal to the computation process, these necessary coordinates. Actually these coordinates are developed simultaneously with the development of the coordinates of the position-motion state of the moving vehicle in a single automatic electrical computation process.

In one particular modification of my invention I have evolved a nonrecursive, noniterative, or closed computation procedure which is more easily applied to the construction of the automatic computation machinery required in any modification of my invention than is the iterative processes (otherwise known as trial and error, hunt and peck, approximate and reapproximate, cut and try, etc.) This closed process has the obvious advantage of not requiring repeated recycling of the elements of the process in order to reach an adequately close approximation. This process involves a closed solution of a set of linear simultaneous equations whose unknown elements are the ranges from the stations to the moving vehicle and certain other unknowns which are linearly related to the ranges. The details of the solution are discussed elsewhere in this specification.

FOUR STATION TRACKER

This is a system for the mapping of the positions of four stations relative to each other. A number of positions of a cooperating aircraft or other cooperating vehicle are determined simultaneously. In this particular embodiment of my invention the distances between the stations are determined rather than the cartesian coordinates. Similarly the ranges to the aircraft from the stations are determined directly rather than the topocentric cartesian coordinates. It is obvious that the derived distance data can be converted to cartesian coordinates if cartesian coordinates are required.

This particular system is intended to be employed under circumstances in which all of the stations must lie in the same plane. With the addition of another station the system can be adapted to use under circumstances where the stations do not all lie in the same plane.

In this system no approximate values of the station positions are required as a priori input data to the computer derived from sources extraneous to the system itself. The automatic computation processes are closed, or noniterative. As an element of the automatic computation function a set of simultaneous equations are solved automatically. This set of equations embraces, as unknowns, ranges from the stations to the aircraft. It is typical (not general) of the equations of this set that all of the equations comprise the same variables.

In this system no accurate frequency standard is required aboard the cooperating vehicle, which carries only a transponding type of equipment which receives signals from one of the ground stations and transmits a signal coherent with the received signal to responsive ground stations.

One of the features of this system is the use of modulation. There are several advantages acquired by the use of modulation as discussed later in this section. While the modulation is essential to this particular method of signal tracking it is still the phase of the carrier signal that is tracked, not the phase of the modulation signal.

Figure 9:
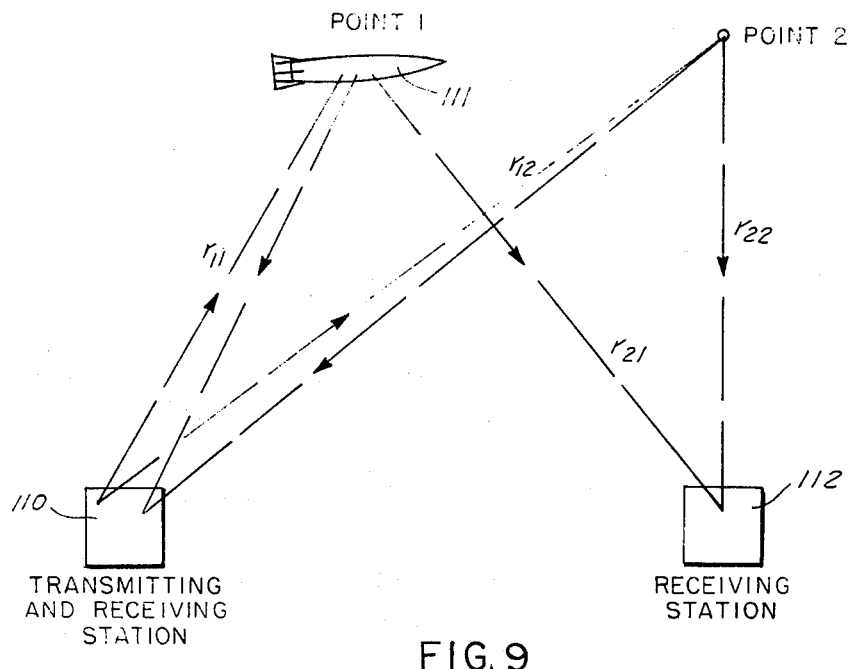
FIG. 9 is a drawing of an arrangement for getting one legged data to be used in accordance with this invention.

FIG. 9 is a diagram indicating the manner in which it is possible to derive single legged data from one element of single legged data combined with double legged data. In this diagram station 110 includes both a transmitter and a receiver which is capable of receiving the echo signal of the transmitter reflected from the moving object 111. Thus $r_{12} - r_{11} = m_1$ is measured at station 110, $(r_{12} + r_{22}) - (r_{11} + r_{21}) = m_{12}$ is measured at station 112 and $r_{22} - r_{21} = m_2$ is obtained by computation.

Figure 10:
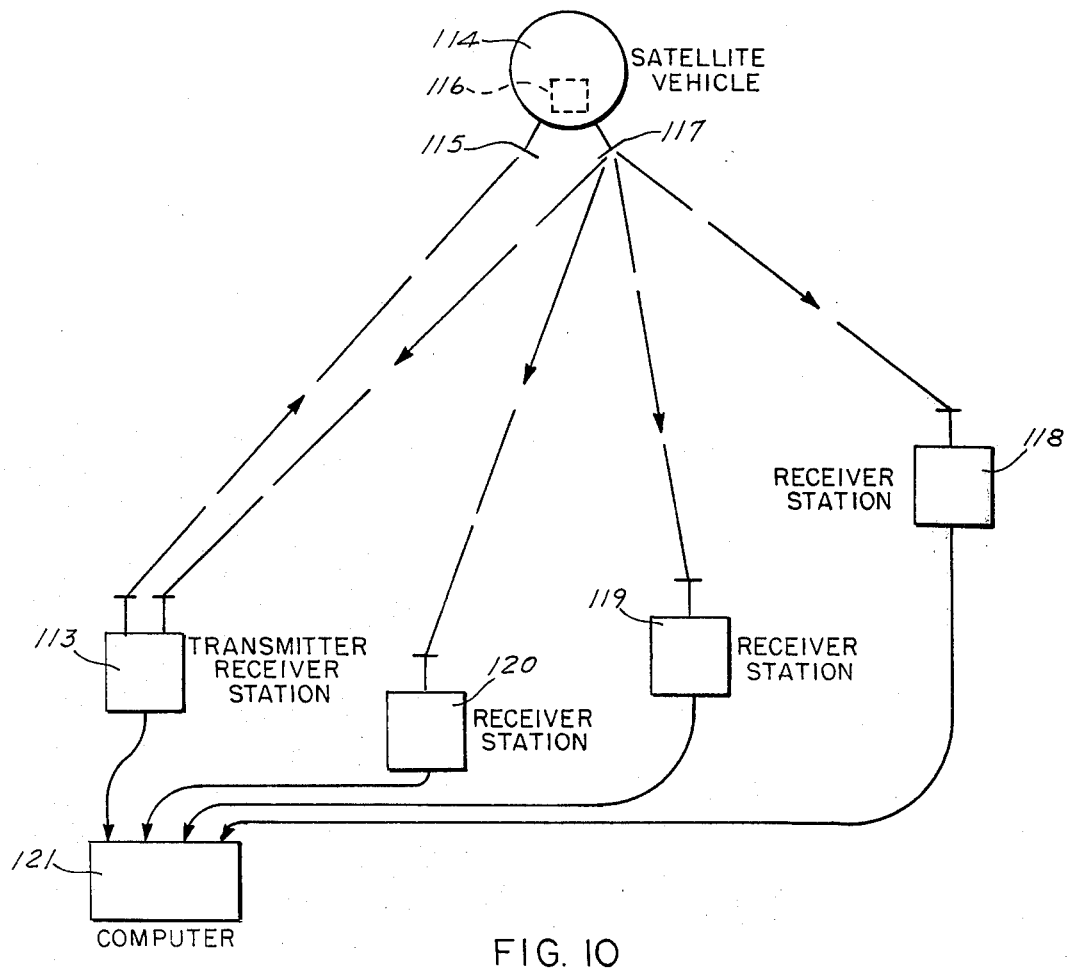
FIG. 10 is a drawing of a four station tracking system.

FIG. 10 shows a diagram of the system in which continuous waves of constant frequency are radiated in all directions from the transmitter of the transmitter-receiver station 113. These waves are intercepted at the vehicle 114 by receiving antenna 115. The signal is tracked in frequency, suppressed carrier amplitude modulated, and amplified by equipment 116 which is aboard the vehicle 114. Special efforts are made to attenuate the carrier, which is at exactly the frequency of the received waves. The two sidebands are radiated over transmitting antenna 117. The modulated signal minus the carrier is transmitted in all directions from the satellite and is received and measured by identical receiving stations 118, 119 and 120 and by transmitter-receiver station 113. The data collected by the receiving stations 118, 119 and 120 and the transmitter-receiver station 113 are transferred by normal communications means to computer 121.

Figure 11:
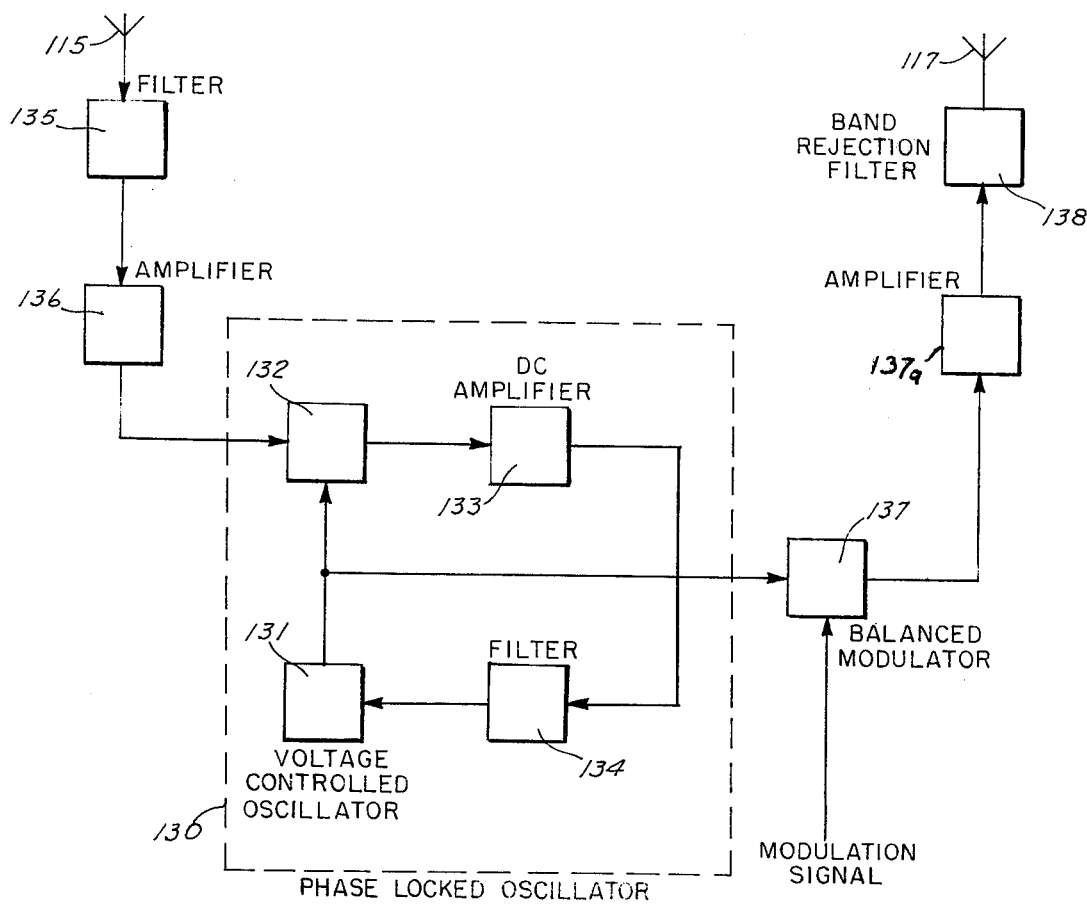
FIG. 11 is a schematic diagram of a transponder circuit.

Each station is equipped with a standard oscillator. The equipment in the vehicle is shown in FIG. 11 and includes a receiving antenna 115 that is connected to the band-pass filter 135 and to the amplifier 136. The output of the amplifier is connected to the mixer of the phase locked oscillator 130 which tracks the incoming signal from the ground transmitter 113. The phase-locked oscillator 130 includes the voltage controlled oscillator 131, mixer 132, d.c. amplifier 133 and low-pass filter 134. The output of the phase locked oscillator 130 is amplitude modulated by the balanced modulator 137 to provide a continuous set of sidebands. The modulation signal may contain the identification of the vehicle, timing marker and communications if desired. The signal is amplified by amplifier 137a and fed to filter 138. Balanced modulation and filter 138 are employed to suppress the carrier before the signal is fed into transmitting antenna 117.

Figure 12:
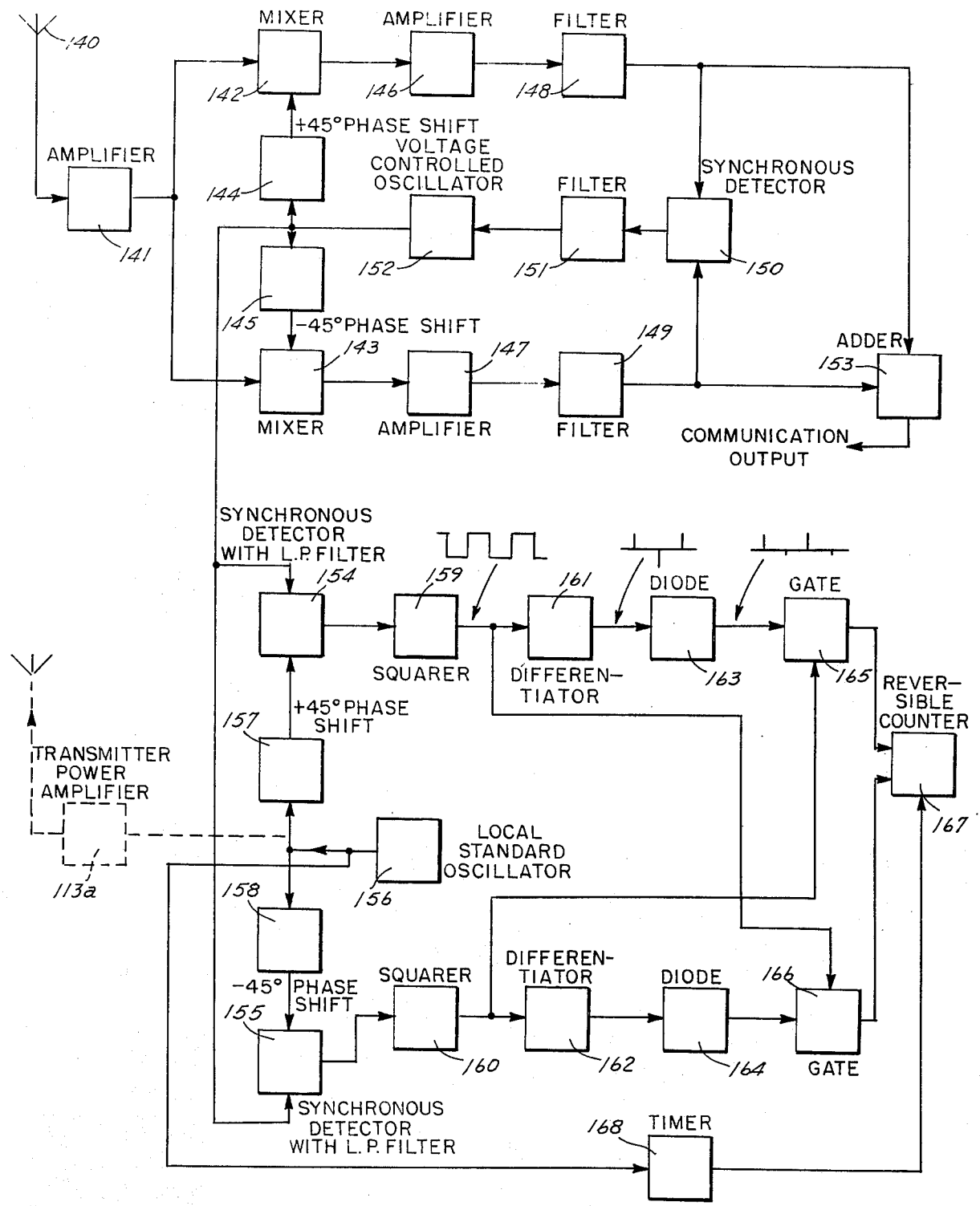
FIG. 12 is a schematic diagram of a tracking station.

The ground receiving and measuring equipment is the same in all four stations. A block diagram of the receiving equipment in one of the ground stations is shown in FIG. 12. The signal from the vehicle 114 is received on omnidirectional antenna 140 at each of the ground receiving stations 113, 118, 119 and 120, and it is amplified in band-pass radio frequency amplifier 141 from whence it enters the two diode mixers 142 and 143. The signals are mixed in these mixers with locally generated signals which are derived from phase shifters 144 and 145 in such a manner that they are ninety degress out of phase with each other. Consequently the outputs of the two mixers 142 and 143 are 90° out of phase with each other. The frequency of the output signal of the mixers (a two-phase signal) is the frequency of the amplitude modulation imposed upon the carrier at the vehicle. This frequency is generally in the region below one hundred kilocycles. In the event that it is merely desired to identify the vehicle, and no communications are required, the modulation in the vehicle may consist of a simple sinewave of fixed frequency. The frequency of this modulation may be used to identify the vehicle. The sidebands thus serve two purposes; they aid in the tracking operation and they identify the vehicle.

After amplification in ampifiers 146 and 147 the signals are filtered by filters 148 and 149 to narrow the spectrum and to include only desired signals. If no other communications than identification are required these filters may be of a very narrow band-pass type. The two signals are then fed into synchronous detector 150 in the output of which is generated a "direct current" signal which upon being filtered by the filter 151 to remove the high frequency signals coming from the detector, is used to control the frequency of the voltage controlled oscillator 152, whose frequency is thus maintained at exactly the value the carrier would have had had it been transmitted from the vehicle 114. There is of course a slight frequency shift of the sidebands owing to the doppler effect, and the filters 148 and 149 must be capable of passing the entire probable doppler spectrum of the modulation signal.

The modulation signal is available at the output of one of the filters 148 and 149 depending upon the polarity of the connections into the voltage controlled oscillator 152. In the presence of noise the modulation signal may be obtained from both channels through the adder 153, thereby improving the quality of the signal derived, and the output of this adder is the communications output. The action of the narrow band-pass filters 148 and 149 is to render the system largely immune to any tracking signal which does not modulate with the desired frequency. Communications signals could be obtained ahead of the filters 148 and 149 if desired thus permitting the selection of the identification signal from the rest of the modulation that may be placed on the carrier for other purposes.

The output of the voltage controlled oscillator 152 is then used for comparison with the local signal to generate the actual doppler signal which is measured. The output of the phase locked circuit just described is fed into two synchronous detectors 154 and 155 which are 90° out of phase with each other.

The frequency of the output signals from these detectors is the difference between the frequency of the local standard oscillator 156 and the center frequency of the two sideband signals received from the vehicle 114. The signal can vary from direct current to very high audio depending upon the wavelength of the signal radiated from the ground transmitter 113A which is located in station 113 and the amount of the doppler frequency shift.

The fundamental components of the two square waves generated by the squarer circuits 159 and 160 are 90° out of phase with each other. If the frequency of the signal from the voltage controlled oscillator 152 is higher than the frequency of the local standard oscillator 156, the phase of the signal from squarer 159 will be 90° ahead of the signal from squarer 160. This condition exists because phase shifter 157 advances the signal while phase shifter 158 retards it. Each phase shifter operates through 45° to produce a 90° phase difference between the two channels. When the frequency of the voltage controlled oscillator 152 is lower than the frequency of the local standard oscillator 156 the phase of the signal from squarer 160 will be ninety degrees ahead of the signal from the squarer 159. The outputs of the two squarers are differentiated in differentiators 161 and 162, forming positive and negative spike pulses at the leading and trailing edges respectively of the square waves. The negative spikes are removed by diode negative limiters 163 and 164. The output of each squarer is also used to gate the spike signal from the differentiator of the opposite channel. In this manner one obtains a spike from the output of gate 165 in the upper channel when the relative phase of the two signals from the squarers is positive and from the gate 166 in the other channel when the relative phase is negative. When one channel is emitting pulses there is of course no output from the other channel. In the above manner pulses are obtained from one channel when the center frequency from the vehicle is higher than that of the local standard oscillator 156 and pulses from the other channel when the signal is lower than the local standard. A pulse occurs in one channel or the other for each beat between the incoming signal and the local standard, thereby indicating a lengthening or shortening in the distance traveled from the ground transmitter 113a to the vehicle 114 and back to the receiver 141 by one wavelength for each pulse, one channel recording the shortening of the path and the other recording lengthening of the path. The outputs of the two channels may each be connected to a separate counter, the count on one counter being subtracted from that on the other counter and the appropriate sign applied to result to indicate the net change in path. In this system reversible counter 167, of which there are several on the market, is employed. There are two inputs to this type of counter and signals into one channel add to the total count and signals from the other channel subtract from the total count. The counter is turned on and off by Timer 168 which employs local standard oscillator 156 as a time standard.

Station 113 only is equipped with a transmitter. This transmitter 113a is shown by dotted lines in the FIG. 12 and employs the local standard oscillator 156 as a frequency standard. The receiving circuits employed in receiving stations 118, 119 and 120 are the same as the receiving circuit shown in FIG. 12 and do not include the transmitter 113a. Each is provided with a counter such as the counter 167 and the outputs of all of these counters are connected to a central computer station 121.

This particular mapping system makes use of a set of equations derived from the range squares invariant relationship. When there are four stations located in a plane one can write the range squares invariant relationship as follows:

$$\sum_{i=1}^{i=4} \alpha_i r^2_i = K$$

where the $\alpha$'s and the K are constants depending upon the locations of the stations within the plane. Actually the constant $\alpha_i$ is associated with the ith station and is proportional to the area of the triangle formed by locations of the other three stations. If five noncoplanar stations are employed the $\alpha_i$ is proportional to the volume of the tetrahedran formed by the locations of the other four stations. (See Uspensky, Theory of Equations McGraw-Hill, 1948).

The $r_i$ represents the range from the ith station to the aircraft. In this system a series of sets of simultaneous changes of the ranges is developed as explained heretofore. Let $m_{ij}$ represent the jth change of range from the ith station, $r_{ij}$ represent the range from the ith station at the termination of the jth change of range $r_{io}$ represent the range from the ith station at the initiation of the measurement sequence. Then $m_{ij} = r_{ij} - r_{io}$ Combining this equation with that of the range squares invariant produces $$\sum_{i=1}^{i=4} \alpha_i m_{ij} r_{io} = -\frac{1}{2} \sum_{i=1}^{i=4} \alpha_i m_{ij}^2$$

One of these equations can be written for every point along the path of the aircraft at which a measurement set is terminated. As shown in my U.S. Pat. No. 3,706,096 these equations can be employed in solutions for the initial ranges when the $\alpha$'s are knonw, i.e. when the positions of the stations are known.

WHEN THE STATION POSITIONS ARE UNKNOWN:

Using a set of these equations and treating the ratios of the $\alpha$ coefficients as unknowns one can find both the ranges and the ratios of the $\alpha$'s. With these elements known the distances between the stations is readily obtained. In the particular computation process employed in this particular planar type modification of my invention seven sets of measurements can be used, a total of 28 measurements.

In this embodiment of my invention the relationships between the measured values and the determined inter-station distances are explicit and a closed solution procedure is employed. Thus there is no requirement for initial approximations of the station positions and/or the aircraft. This ability to perform my invention without any a priori position data is particularly useful in military applications, where mapping must sometimes by accomplished without such data. In this embodiment of my invention the positions of the stations to be determined are entirely unknown relative to each other.

The last written equations may be rewritten as follows:

$$\sum_{i=1}^{i=3} m_{ij} \left( \frac{\alpha_i}{\alpha_4} r_{io} \right) + m_{4j} (r_{40}) + \frac{1}{2} \sum_{i=1}^{i=3} m_{ij}^2 \left( \frac{\alpha_i}{\alpha_4} \right) = -\frac{1}{2} m_{4j}^2$$

thus providing a nonhomogeneous equation in the unknowns indicated within the brackets. A suitable set of these equations is acquired by the performance of appropriate groups of contiguous incremental type doppler measurements. For an entirely linear type solution seven groups of simultaneous measurements are required since there are seven unknowns in the equation set. Having acquired the ratios of the alphas the ranges are at once determinable from the other unknowns by division. The ratios and the ranges define the size and shape of the quadrangle of the stations. A solution employing the line segments of the "complete quadrangle" (projective geometry) provides the size and shape of that quadrangle.

MAPPING SYSTEM WITH AIRBORNE RECEIVER AND GROUND BEACONS

An important embodiment of my invention employs a number of radio beacon transmitters located on the ground at unknown positions. The signals from the beacons are received simultaneously by a receiving apparatus on board an aircraft. The positions of the beacons relative to each other are entirely unknown, as is the position and course of the aircraft. It is the primary purpose of this modification to determine the positions of the beacons relative to each other. Ancillary to the primary purpose is the determination of the position and course of the aircraft.

If it is desired to establish the positions of the stations or beacons relative to some general grid this may be accomplished either by determining some or all of the coordinates of one or more of the stations relative to the grid using well known methods exterior to the process of my invention. Similarly dimensions of the position-motion state of the aircraft relative to the grid may be employed using well know processes. Combinations of dimensions of ground beacons and aircraft position may also be employed to locate the station complex relative to the general grid.

NAVIGATION SYSTEM FOR SURVEYING

Figure 13:
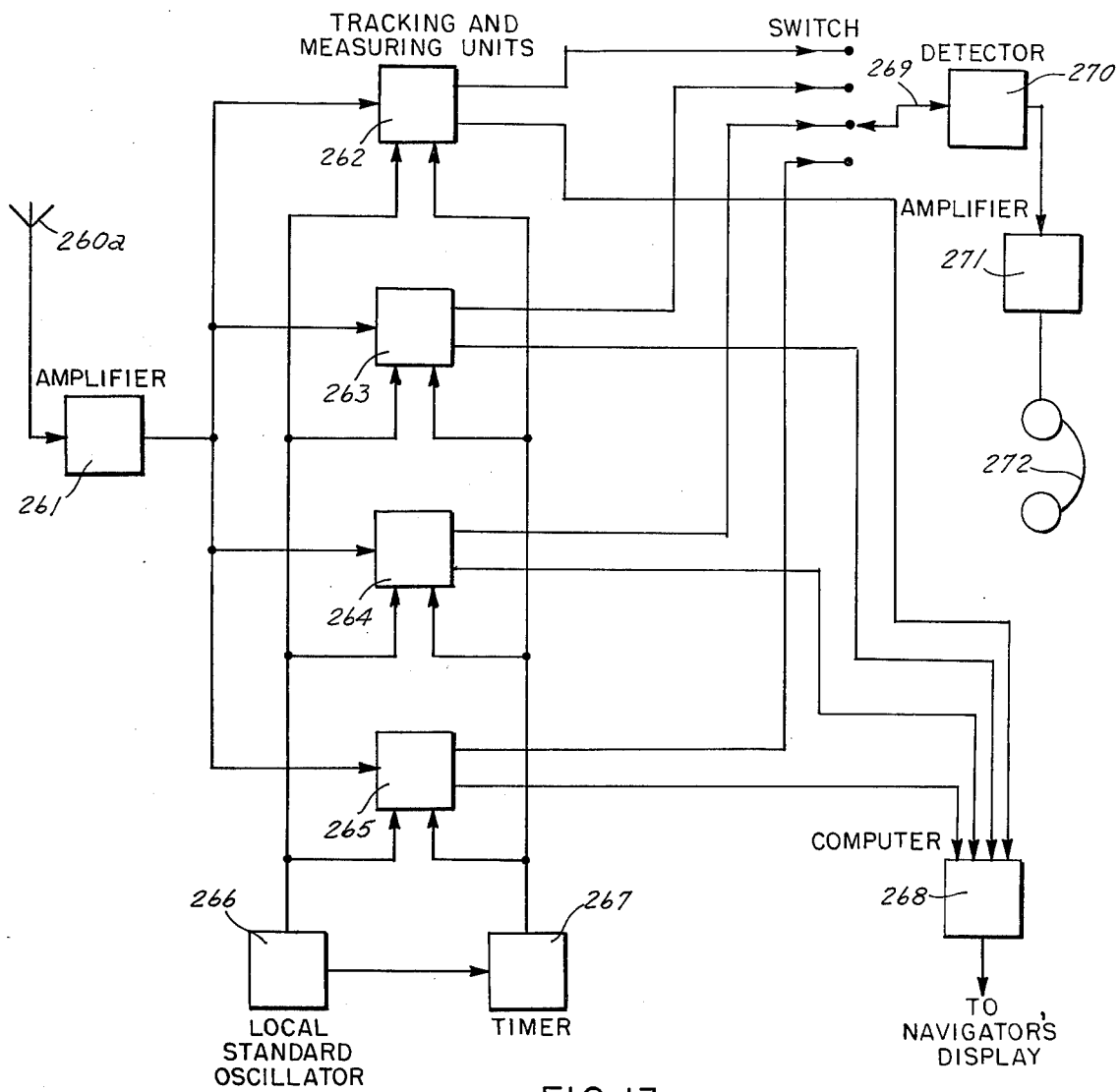
FIG. 13 is a schematic diagram of the circuit of the airborne navigation receiver.
Figure 15:
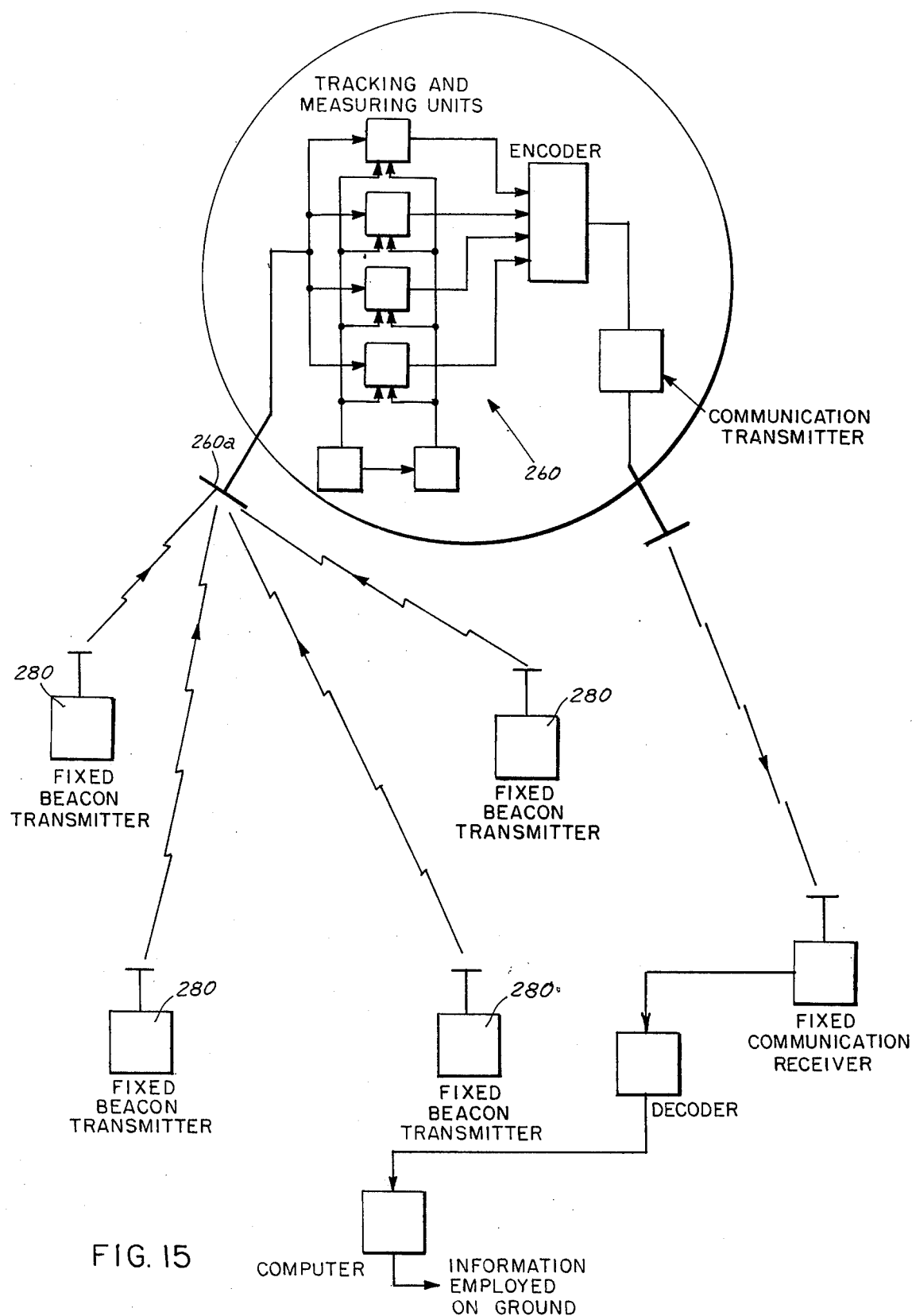
FIG. 15 is a diagram of the navigation system arranged in accordance with this invention.

Another practical embodiment of my invention is a system and method for determining the positions of ground stations by taking doppler displacement measurements with the receiving and measuring equipment 260, FIGS. 13 and 15, located in the vehicle, the transmitting equipment being located on the ground. For the purpose of this example a four station system is chosen. Four transmitters 280 are located on the ground as shown in FIG. 15. The receiving equipment is located in the vehicle. The transmitters radiate a suppressed carrier-double sideband signal of high frequency stability and phase stability. No attempt is made to hold any particular phase angle between stations. All of the transmitter stations employ the same nominal center frequency. Each station is amplitude modulated by a simple sinewave and its carrier is suppressed. Each station has a particular modulation frequency assigned to it so that it may be identified. The modulation serves also as an aid in tracking the frequency of the signal by the equipment in the vehicle. The means of tracking such a signal and reestablishing at the receiver the carrier removed at the transmitter have been discussed elsewhere in this application.

Four synchronous receivers are employed and each is tuned to the same center frequency. However each is tuned to a separate audio identification signal corresponding to the particular transmitting station with which it is to operate. Each receiver reestablishes the center frequency in the process of detecting the modulation envelope. This signal is of the same frequency and phase as the carrier would have been at the receiver antenna had it not been suppressed at the transmitter. FIG. 12 shows one of the four tracking and measuring equipments. The communications output may be employed for identifying the particular transmitter and also for receiving voice communications from the transmitter. In the event that voice communication is employed the identifying tone is the subcarrier and the voice communication must be obtained by detection of this signal. The transmitter shown in FIG. 12 is not employed. There is only one local standard oscillator and only one timer in the airborne equipment, all four tracking units operating from one set of these two devices. The outputs of the four tracking and counting units are the measurement signal from the reversible counters. This information is in parallel form and is transferred, all digits at once, by a plurality of wires to a digital computer in the aircraft. The computer employs an iterative solution process to determine the path of the aircraft and the positions of the transmitters. The number of contiguous sets of measurements employed in a particular solution process is determined by the particular computation process and the redundancy desired. A minimum of eight sets of measurements is generally required. With this solution it is possible to adjust the local standard oscillator to the frequency of the ground system or to note the difference between the two. The solution process is based upon the assumption that the oscillator in the vehicle is stable in frequency during the course of the measurement.

Referring to FIG. 13 there is shown a schematic diagram of the airborne receiving, measuring and computing equipment, such as the equipment 260 shown in FIG. 15. The signals from all four transmitters 280 are received by the vehicle on a single antenna 260a and amplified in a common amplifier 261. The signal is then fed into tracking and measuring units 262, 263, 264 and 265 which receive frequency standard and time signals from local standard oscillator 266 and timer 267. The measurement data is fed as stated into computer 268. An alternate computer may be located on the ground as shown in FIG. 15 and a suitable radio link provided between it and the vehicle as shown in FIGS. 13 and 15. The communications outputs of each receiving unit is fed to a point on switch 269 so that the modulation on any of the subcarriers may be selected and heard over the headphones 272 after being detected by detector 270 and amplified by amplifier 271.

Figure 14:
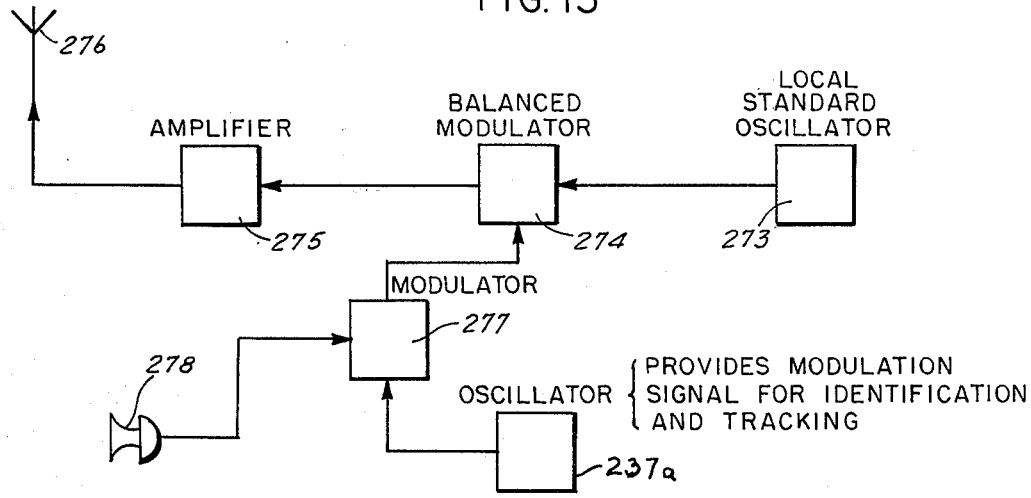
FIG. 14 is a schematic diagram of the circuit used in the ground beacon transmitter of the navigation system.

In FIG. 14 is shown the very simple transmitter used in the four stations 280. At each station there is a highly stable and accurate local standard oscillator 273, whose signal is modulated by balanced modulator 274 which suppresses the carrier and leaves only the two sidebands. If there is no voice communication the modulation is a simple sinewave provided by oscillator 273a and the radiated signal consists of just two frequencies. The modulated signal is amplified by Class B amplifier 275 and radiated by antenna 276. If voice is to be transmitted over the transmitter the modulation signal is itself modulated by modulator 277 with signals derived from microphone 278.

MOTOR LOCATOR

Figure 17:
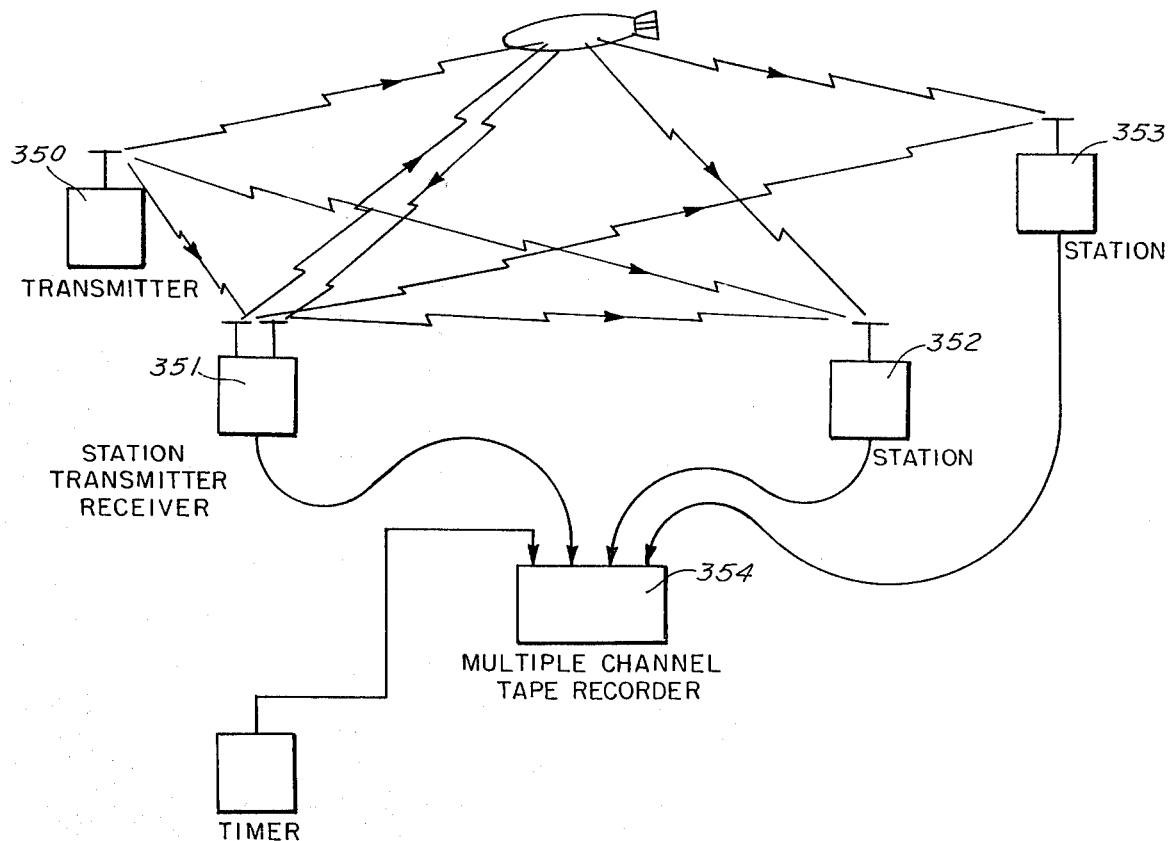
FIG. 17 is a diagram showing the arrangement of stations used in the mortar locator system.

It has long been a problem in infantry warfare to determine the position of hostile cannon, mortars, and other missile launching devices so that counterfire might be directed against such sites. The arts of modern war have not eliminated this requirement. The great progress in the miniaturization of computing elements has made the computer a battlefield tool. Since the purpose in this application is not to shoot down the shell but to detect the position of the launcher, one can gather data over a very substantial portion of the trajectory of the shell and take much more time for completing the calculation of the track accomplished from the data obtained. The system may also be used to adjust friendly fire. Whereas other mortar detection equipment has in the past depended upon the use of radar tracking devices employing large parabolic reflectors, my invention makes possible the use of whip antennas or other such antennas of low gain which are much less conspicuous. The requirements of this system do not include the simultaneous tracking of a number of missiles. However it is required that the system be able to track a single target even though there may be several targets in the air simultaneously. This system is relatively simple and therefore requires somewhat more effort in use than a more elaborate and consequently heavier system. To simplify the equations which must be solved and to keep the number of stations to an absolute minimum the system configuration consists of four stations in a plane as shown in FIG. 17. Small deviations from the planar condition such as are expected under battlefield conditions effect the accuracy of the system but do not disable it. The calculations involve only the solution of three simultaneous linear equations and the separate solution of a quadratic equation in one variable. A system employing five stations may be employed which does not require that the stations be located in a plane. Alternatively a system employing three stations could be devised if it were possible to position the stations along a line and to get along with two dimensional information regarding the path of the vehicle. The battlefield equipment may be arranged to work in a number of different modes dependent upon particular conditions existing on the battlefield at a given time. A further use for this type of system is the location of a submarine which fires a rocket missile such as the Polaris. In this instance there may be the additional problem of getting sufficient data to shoot down the missile. However there is also a prime requirement for locating the submarine before it can discharge the rest of its rockets. The system to be described here may be placed aboard four small naval craft whose position relative to each other is known and adjusted through radar readings. The coplanarity requirement is more easily met with ocean vessels since it is only necessary that they maintain their positions so that they are on a common circle. Again errors in exact location in the plane is not disabling to the system. Furthermore, for naval use the ship could carry a computer that is more sophisticated and able to handle a three dimensional station distribution by use of an iterative solution.

In both the land and the naval systems it is desirable to avoid the necessity of communications between stations in the performance of the tracking operation. It would be desirable to employ a single receiving station and have all the rest of the stations be transmitters. However two advantages are gained by employing two receiving stations; namely, (1) the number of stations required for this reflective type system is reduced by one, whereas without the use of the second receiver five stations would be required in the system, and (2) the second receiver makes possible the resolution of ambiguity under conditions when two or more targets enter the field of the system simultaneously. The communications between the two receiving stations need not be carried on during the actual tracking of the missile. Rather the complete recorded data for the entire track may be communicated to the station or vessel carrying the computer after the tracking operation is completed if desired. The data itself is in digital form and need not be voluminous in most applications. A dozen or so readings containing perhaps a dozen or so digits each would be enough to provide a great deal of information relative to the track and initial point of the track. This figure would also include the necessary timing information. In the land based system shown here data is transferred by analogue means.

To make possible a closed solution in the simplest form, the double legged information originally collected by the receiving stations is converted into single legged data. This data is then employed in a very simple computation to determine the positions occupied by the vehicle at each counting point. Two methods of computation employing single legged data are available. In one method four readings must be taken for a complete solution and a set of four linear equations in four unknowns results. In other method only three measurements need be made but one must solve a quadratic equation. The relative accuracies of the two methods and the relative ease of carrying out the computation process determines which method is employed in a particular application.

As mentioned elsewhere in this application there is a reduction of sensitivity in a c.w. system in which a station must detect the echo from its own transmission. Since the echo signal is only removed from the transmitted carrier by the amount of the doppler shift the unavoidable residual noise near the carrier tends to mask the fainter echos. This interference of the receiver by the transmitter at the same station is greatly reduced if the receiver and transmitter operate at different frequencies.

Figure 16:
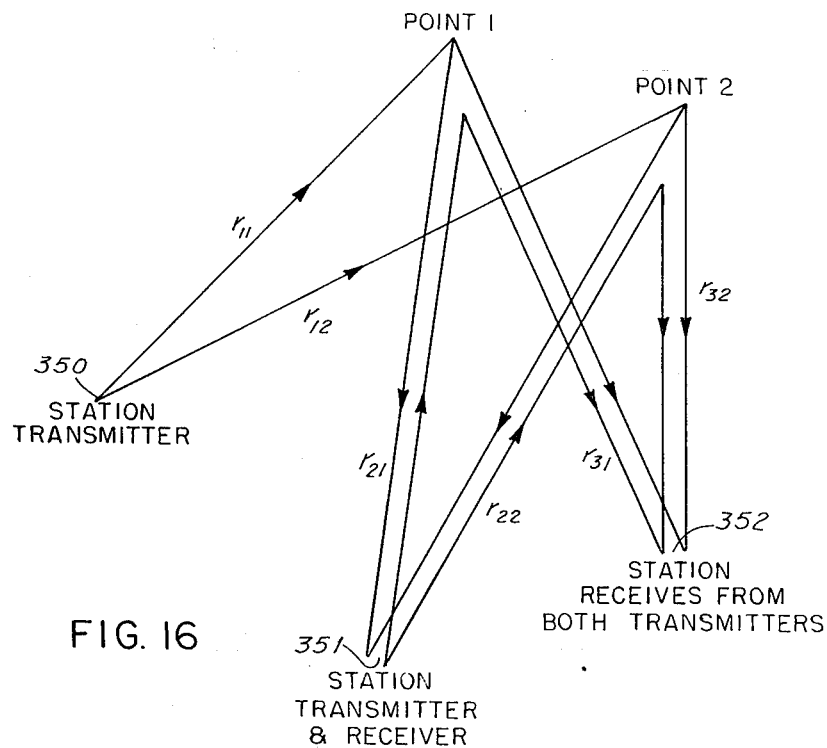
FIG. 16 is a diagram used to facilitate explanation of an arrangement for obtaining single legged data from double legged data.

In order to reduce double legged data to single legged data in any system comprised of four or more stations it is only necessary that one of the stations has the capability of transmitting and receiving, and it is not necessary that that station be capable of receiving the echos of its own signal. When one element of single legged data can be determined in some manner this element of information may be employed to convert all other double legged data into single legged data. In this system the required initial element of one legged data is derived from the data derived from three of the four stations of the system, one of these stations being the only station in the system which transmits and receives, another of the stations being a receiving station, and another being a transmitter station. The fourth station in the system is a receiving station and while double legged data is taken from it simultaneously with the other stations this double legged data is not employed to obtain the initial single element of single legged data. The double legged data from the fourth station is combined with the initial single legged data derived from the double legged data from the other three stations to provide the complete set of single legged data desired for a closed algebraic solution. FIG. 16 shows the relationship between the three stations used to derive single legged data. Only station 351 both transmits and receives. Station 350 transmits only and station 352 receives only. Station 352 and station 353 receive and measure data from both station 350 and station 351. Station 351 receives only from station 350 and does not record the echo of its own signal. Station 350 and station 351 transmit on different frequencies. Therefore station 351 transmits and receives on different frequencies. Stations 352 and 353 receive on two frequencies and are thereby able to distinguish between echos received from the two transmitters.

The computational procedure for deriving the desired single legged data from the observed double legged data is very simple and is as follows Let $$(r_{12} + r_{22}) - (r_{11} + r_{21}) = p_{12}$$

$$(r_{22} + r_{32}) - (r_{21} + r_{31}) = p_{23}$$

$$(r_{12} + r_{32}) - (r_{11} + r_{31}) = p_{13}$$

Where:

The r's are the ranges indicated in FIG. 16, the first subscript indicating the number of the station and the second subscript indicating the number of the point representing the position of the vehicle at the beginning or ending of the measurement.

The p's are the measured quantities, the first subscript representing the transmitter associated with the measurement and the second subscript representing the station where the signal was received. The following relationships are derived from the above equations:

$$r_{12} - r_{11} = \tfrac{1}{2}(p_{12} - p_{23} + p_{13})$$

This is the single legged data of change in range desired for the closed solution and is denoted by m or M elsewhere in this application. Similarly the following equations are obtained $$r_{32} - r_{31} = \tfrac{1}{2}(p_{13} - p_{12} + p_{23})$$

$$r_{12} - r_{21} = \tfrac{1}{2}(p_{13} - p_{12} - p_{23})$$

Thus the change in range from each of the three stations is determined. The change in range from the fourth station is determined by subtracting the range data from one of the transmitters from the double legged data obtained by the fourth station using that same transmitter. Either transmitter would serve this purpose. Since the fourth station is capable of receiving from both transmitters redundant data becomes available for other purposes including resolution of ambiguity.

FIG. 17 shows the complete system. The frequency of each transmitter is controlled by its own crystal oscillator and this frequency is different from that of the other transmitter. In this application there is no problem of maintaining the frequencies to great accuracies since the receivers are synchronized to the transmitters by receiving directly the radiation from the transmitters. This mode of operation is possible in this case because of the relatively small distances involved. Both station 353 and station 352, have two receiving units, one for each transmitter. The transmitters are extremely simple being merely crystal controlled continuous wave generators coupled to their respective antennas. The echo signals received at each receiver unit are detected and modulated in such a manner that the signals may be conveniently amplified and transmitted to the control center 354 where they are recorded on magnetic tape simultaneously with the signals from the other receiver units. Timing signals are easily applied to the tape along with the signals from the receiving units. Other ancillary data may be included also. Tape recorders with multiple tracks adequate for this purpose are common on the market. The timing signals are not required for the determination of the path of the vehicle. However they would be required when one wishes to determine the velocities as well.

The purpose of the tape recording is to allow a more thorough examination of the signals and to permit the determination of the projectile path with less equipment. Only one counter would be required to break down the data on the tape as the tape may be replayed as many times as necessary each time counting a different signal until all the signals from all the receiving units have been measured. Another purpose in the recording is to relieve crews of the necessity of continuous watch. Automatic equipment not shown may be employed to start the tape recorder when a signal is received so that a complete record is attained of a sudden firing after a period of quiet. The data reduction process will be described subsequently.

Figure 18:
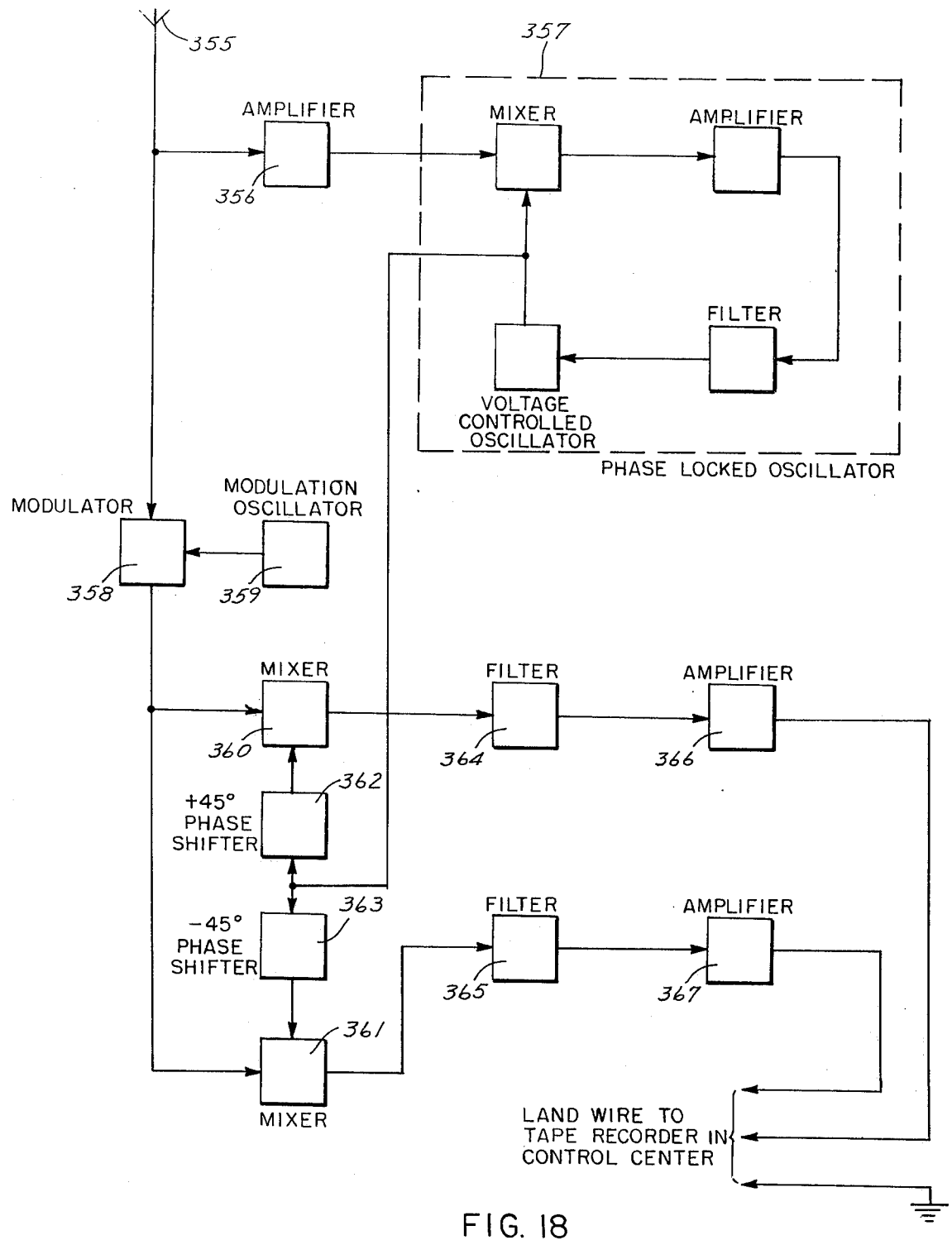
FIG. 18 is a schematic diagram of connections used in the remote mortar locator station.

FIG. 18 shows the receiving unit of which station 351 has one, tuned to the frequency of the transmitter at station 350, and of which station 352 and station 353 each has two, one tuned to each transmitter. The operation of the receiving unit is very simple. Signals are received on antenna 355 directly from the transmitter to which it is tuned and from the target as reflections, the signal from the transmitter being substantially larger in amplitude than the echo signal. The signal from the antenna is fed into the isolation amplifier 356 whose main function is to prevent signals from phaselocked oscillator 357 from going back into the antenna circuit. From the isolation amplifier 356 the signal goes to phaselocked oscillator 357. This oscillator closely tracks the signal received from the transmitter because that signal is much larger than the echo signals. In some situations it might be possible to operate the system without the phase locked oscillator 357, employing in its stead the amplified signal directly from the transmitter or perhaps even without amplification. However the system shown is more applicable to the wide variety of signal strengths and background noise found under field conditions.

The signal from the antenna 355 is then amplitude modulated by modulator 358 with a sinusoidal wave derived from modulation oscillator 359. This modulation frequency is somewhat higher than the maximum frequency shift expected due to the doppler effect. The purpose of the modulation is to provide a carrier signal for amplification and transmission subsequent to detection in mixer 360 and mixer 361. Mixers 360 and 361 are fed mixer signals from phase locked oscillator 357 through phase shifters 362 and 363 so that the mixing signals applied to the mixers are 90° out of phase with each other. Bandpass filters 364 and 365 have their pass band centered on the modulation frequency and have a bandwidth sufficient to contain the frequencies present because of the doppler shift. The signals from the filters are then amplified in amplifiers 366 and 367 which have output impedances suitable for matching the transmission lines to the control center. The signal is amplified and recorded on magnetic tape at the control center as stated before.

Figure 19:
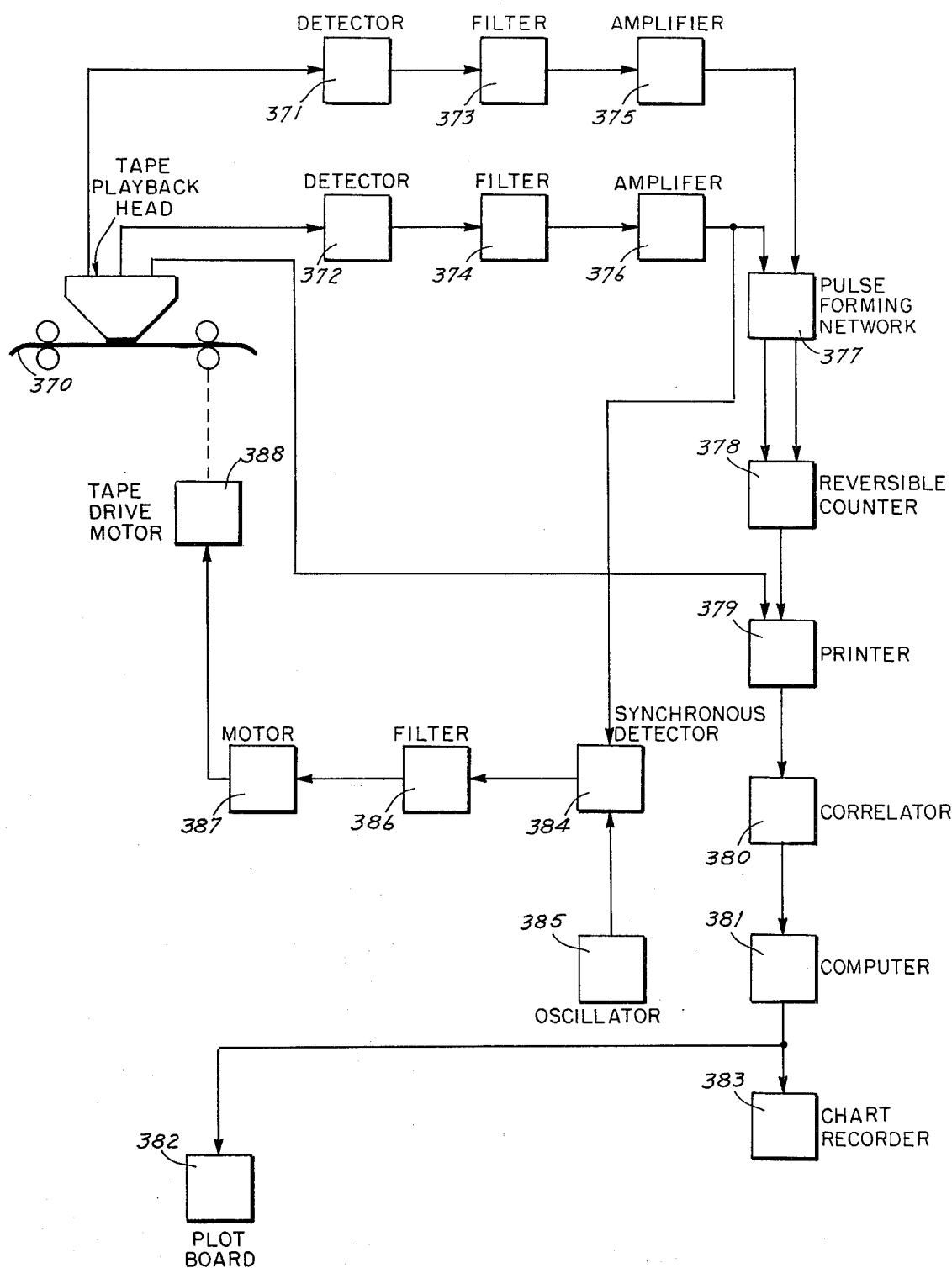
FIG. 19 is a schematic diagram of connections used in the control center of the mortar locator.

The process and apparatus for analysing the signals on the tape will be described in connection with FIG. 19. It is not necessary that electrical connections be made between all of the units. Data may be transferred between the printer and computer in the form of punched tape for instance, or on cards.

Each of the receiving units has a separate pair of tracks on the tape 370. The signals on each track of a given pair are 90° out of phase with each other. The pair of tracks from one receiving unit may of course contain the recorded echo signals of two or more targets. The pair of signals for any particular target will, after detection by detectors 371 and 372, be ninety degrees out of phase with each other and the relative phase position between the two will be determined by whether the two legged distance from transmitter to target to receiver is increasing or decreasing. After amplification in amplifiers 375 and 376 the signals are fed into the pulse forming network 377 shown in FIG. 19. The pulses from this circuit drive the reversible counter 378 which in turn drives printer 379. The timing signal from the tape is also fed into the printer so that a complete set of printed data of count versus time is obtained. This data is fed into the correlator 380 from whence it proceeds to computer 381 and thence to plot board 382 and chart recorder 383. Since there may be echos from more than one target on the pair of tape tracks being examined means are provided for tracking one pair of signals by regulating the speed of the tape drive so as to produce a nearly constant frequency at the output of amplifier 376. A signal from this point is fed into synchronous detector 384 which also receives a signal of constant frequency from oscillator 385 which determines the operating frequency of the channel. When the signal from amplifier 376 is exactly 90° out of phase with the signal from oscillator 385 there is no d.c. output from the synchronous detector 384. When the signal from amplifier 376 departs from this 90° relationship there is a d.c. signal from the synchronous detector 384 which is employed to control the speed of the drive on the tape transport. The signal from the synchronous detector 384 is fed through low pass filter 386 which has suitable characteristics for use in the servo loop of which it is a part. From the filter 386 the signal controls the motor drive unit 387 which in turn controls the tape drive motor 388. Band pass filters 373 and 374 are placed between detectors 371 and 372 and amplifiers 375 and 376 to reduce the amplitudes of all signals of frequency other than the frequency being tracked. The center frequency of these filters is of course that of the oscillator 385.

In the above manner already described one obtains a system which is the geometrical equivalent of a system in which he change in range from the target to each station is measured directly.

When four stations are located in a plane one can write the following equations $$\alpha_1 r_1^2 + \alpha_2 r_2^2 + \alpha_3 r_3^2 + \alpha_4 r_4^2 = k$$

$$\alpha_1 m_{11} r_1 + \alpha_2 m_{21} r_2 + \alpha_3 m_{31} r_3 + \alpha_4 m_{41} r_4 = -\tfrac{1}{2} (\alpha_1 m_{11}^2 + \alpha_2 m_{21}^2 + \alpha_3 m_{31}^2 + \alpha_4 m_{41}^2)$$

$$\alpha_1 m_{12} r_1 + \alpha_2 m_{22} r_2 + \alpha_3 m_{32} r_3 + \alpha_4 m_{42} r_4 = -\tfrac{1}{2} (\alpha_1 m_{12}^2 + \alpha_2 m_{22}^2 + \alpha_3 m_{32}^2 + \alpha_4 m_{42}^2)$$

$$\alpha_1 m_{13} r_1 + \alpha_2 m_{23} r_2 + \alpha_3 m_{33} r_3 + \alpha_4 m_{43} r_4 = -\tfrac{1}{2} (\alpha_1 m_{13}^2 + \alpha_2 m_{23}^2 + \alpha_3 m_{33}^2 + \alpha_4 m_{43}^2)$$

Where the $\alpha$'s and the K are constants depending upon the locations of the stations within the plane and the M's are the single legged measurements as described elsewhere in this specification. Those equations are sufficient to determine the ranges to each of the four stations, whose position is known. The computation process is facilitated by solving the three linear equations for three of the ranges keeping the fourth as a constant. These three may then be substituted in the fourth degree equation to obtain a single quadratic equation in one unknown. After finding the four ranges conversion to cartesian coordinates is routine and will not be described here. If a completely linear solution is desired a fourth equation, $$\alpha_1 m_{14} r_1 + \alpha_2 m_{24} r_2 + \alpha_3 m_3 r_3 + \alpha_4 m_4 r_4 = -\tfrac{1}{2}(\alpha_1 m_{14}{}^2 + \alpha_2 m_{24}{}^2 + \alpha_3 m_{34}{}^2 + \alpha_4 m_{44}{}^2)$$

may be derived as above.

SELF SURVEY

The mortar locator embodiment of my invention is intended for battlefield use. It is apparent that the effectiveness of the system is greatly enhanced by its self-survey capability. The system maps the positions of its own stations by performing the doppler measurements on shells or other targets that are either hostile or friendly.

As shown elsewhere in this specification a sufficient number of equations of the type shown above is derived from sets of simultaneous measurements of changes of wave propagation paths occuring as the target object moves in the proximity of the system. The relationships between the group of measurements and the group distances defining the total geometrical configuration comprising the points of all of the stations and the points along the object path at which the measurements are commenced and terminated are exact and definitive. This fact is the discovery of the applicant and underlies instant invention.

An important aspect of this modification of my invention is the optional capability of determining the positions of the individual stations relative to one another without any a priori estimate or approximation of these position. No knowledge (exact, approximate, or estimate) of the positions of the stations either relative to each other or relative to some external grid or system of coordinates is required. The closed solution technique is a part of my development of this invention and provides, in addition to the above capability, higher computing speeds and/or minimum computer requirements.

ALTERNATIVE CIRCUITS

Figure 20:
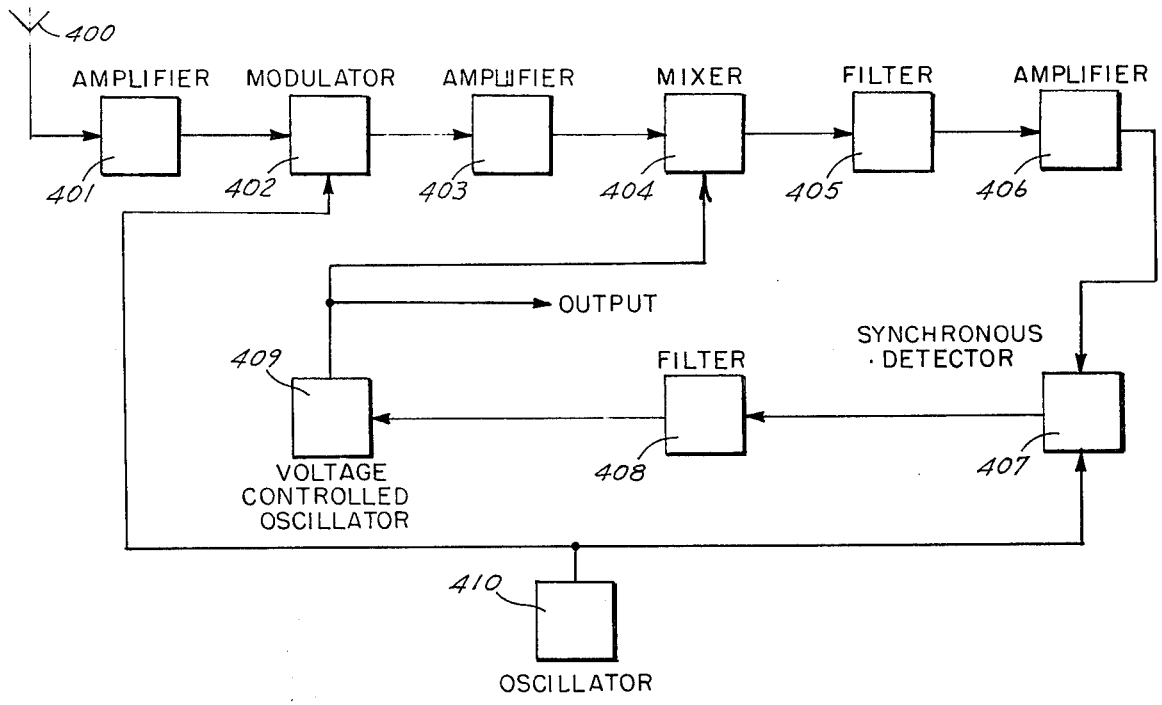
FIG. 20 is a schematic diagram of connections of an improved phaselocked oscillator.

The phase locked oscillator, several improved variations of which are shown in the various modifications of my invention, is a well known circuit component. This type of circuit is also variously known as a "phase locked loop" and as a "tracking filter". Simplified phase locked oscillators are shown in FIGS. 11 and 18 as devices 130 and 357, respectively, and the circuit shown in FIG. 20 may be used in place of these devices. It is the function of this circuit to generate a continuous wave signal that is of the same frequency and phase as the incoming signal that it is tracking but with greater power and reduced noise. In the circuits referred to above the d.c. and low frequency control voltage is obtained from the mixer and filtered and amplified in a low pass amplification circuit. The circuit shown in FIG. 20 is an improved phase locked oscillator in which the problems of d.c. amplification and of stabilizing the d.c. output characteristic of the mixer are circumvented. This circuit may be operated directly from the antenna or it may be employed in circuits where the signal has undergone considerable translation or other processing. This circuit is an excellent substitute for the circuits numbered above. The circuit shown in FIG. 20 operates in the following manner. The signal is received on antenna 400 and amplified in amplifier 401 in the conventional manner. Amplifier 401 must have a sufficiently broad bandwidth to cover the entire frequency spectrum of operation of the phaselocked oscillator, since the tuning of this amplifier is not variable and does not track the frequency of the input signal. The signal is then modulated with a simple sinewave modulation signal adding a pair of sideband signals to the original unmodulated signal. This modulated signal is then amplified in amplifier 403 whose bandwidth, like that of amplifier 401, is sufficiently broad to accommodate the entire frequency excursions of the incoming unmodulated signal. In addition the bandwidth of amplifier 403 must be wide enough to accommodate the modulation as the total signal spectrum moves as a result of the doppler effect, equipment instabilities, or other causes of frequency shift. Amplifier 403 is tuned to the same center frequency as that of amplifier 401. Also like amplifier 401, amplifier 403 is fixed tuned; the tuning does not follow the frequency shift of the signal being tracked. The modulated signal then enters mixer 404 where it is mixed with a signal from voltage controlled oscillator 409 to produce a signal of the modulation frequency. All other signals from the mixer are suppressed by filter 405. Filter 405 is a bandpass filter whose bandwidth is just wide enough to pass the modulation frequency and may be sharply tuned. The signal from the filter 405 is amplified by conventional means in amplifier 406 and fed into synchronous detector 407. The output from detector 407 contains d.c. and low frequency components that are employed to control the frequency of voltage controlled oscillator 409. Filter 408 is a low pass filter and removes all high frequency components such as carrier frequency signals from the control signal. The exact design of filter 408 determines the response characteristics of the over all phaselocked oscillator. When the signal output of the voltage controlled oscillator is of the same frequency as the center frequency of the signal input to mixer 404 and ninety degrees out of phase with that signal there is no detectable signal of modulation frequency at the output of the mixer 404. When the input signal or the oscillator signal shifts in phase so that a component of the modulated signal input to mixer 404 is in phase with the mixing signal from voltage controlled oscillator 409 there appears at the output of the mixer 404 a signal of modulation frequency whose polarity is determined by the direction of the phase shift. This signal of modulation frequency is either directly in phase with the modulation signal applied to modulator 402 from oscillator 410 or directly out of phase with that signal. This signal then is approximately proportional to and of the same sign as the phase displacement from the standard ninety degree relationship between the two inputs to mixer 404. The synchronous detector provides a d.c. output of one polarity when the error signal fed to it from amplifier 406 is in phase with the synchronizing signal fed to it from oscillator 410 and a signal of the opposite polarity when the two input signals are of opposite phase. The d.c. control voltage from synchronous detector is essentially proportional to the amplitude of the signal output from amplifier 406 since the signal from oscillator 410 is normally at a greater signal level than the output of the amplifier 406. The filtered output of synchronous detector 407 is connected of such polarity to the control circuit of voltage controlled oscillator that original phase error is reduced or eliminated. The oscillator 410 operates at a convenient low frequency and requires no particular stabilization other than that its frequency should remain in the pass band of filter 405.

For the purposes of the systems described in this application the fact that there is ninety degrees between the phases of the input signal and the signal from the voltage controlled oscillator, which is the output signal of the circuit, is of no consequence. In other applications a ninety degree phase shifter could be placed at the output of the voltage controlled oscillator 409 so that the signal from it would be nominally in phase with the signal input to the circuit.

The output of this circuit may be fed to a frequency meter or a counter which when a proper frequency or time standard is employed would provide a complete doppler receiving station.

Figure 21:
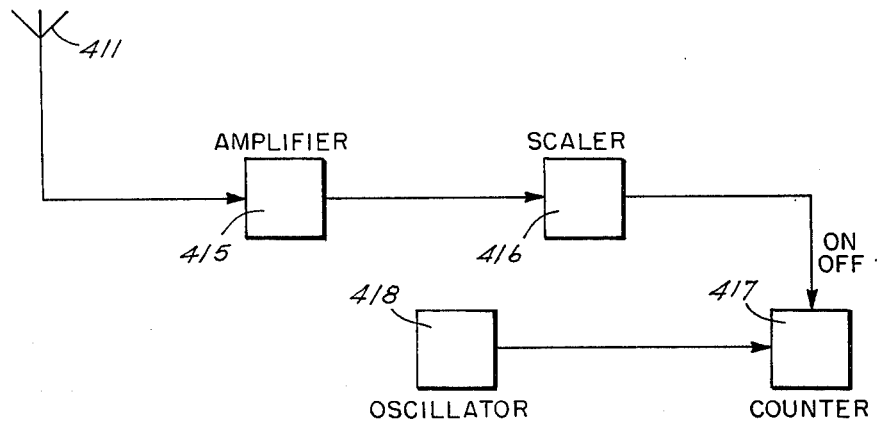
FIG. 21 is a schematic diagram of connections adapted to be used in a cycle timing station.

FIG. 21 shows a doppler receiving station of a rather elemental variety in which all of the essentials are present. In this system the time required for a predetermined number of cycles of the transmitted wave to arrive at the receiving antenna is determined. From this data the change in range that has occurred during the measured interval is found by use of the following relationship $$r_2 - r_1 = C\left(T - \frac{Q}{f}\right)$$

where:
$r_1$ is the range at the beginning of the measurement.
$r_2$ is the range at the end of the measurement.
Q is the number of cycles arriving at the receiving station during the measurement.
C is the velocity of propagation.
T is the time elapsed during the measurement.
$f$ is the frequency of oscillations emitted from the vehicle being tracked.

This expression may alternatively be written $$r_2 - r_1 = \lambda (Q_t - Q_r)$$

Where:
$Q_t$ is the number of waves transmitted during the measuring interval.
$Q_r$ is the number of waves received during the measuring interval.
$\lambda$ is the wavelength corresponding to the frequency of the transmitter.

It is of course readily apparent that these equations are approximations valid only for vehicles that are travelling at velocities slow compared to that of the wave propagation. The corrections that must be applied for extremely high velocities are not presented here. In FIG. 21 the signal is received by antenna 411, amplified in a conventional amplifier 415 and fed into a scaler 416 where the frequency is divided by flip-flops or multivibrators to a convenient value. Signals from this scaler are then employed to turn counter 417 which counts the number of cycles of oscillation of a signal from oscillator 418. Several such stations may be used to form a system as described elsewhere in this application. If several such identical receiving stations are employed in a system to measure the signal from a moving continuous wave transmitter it will be seen that as each receiver counts the same number of cycles of the transmitted wave the time required for each receiver to make the count is different and one may be inclined to doubt the validity of the geometric model that is employed in the system. However the error described is only that owing to the change in the position of the transmitter during this extremely slight time difference. For vehicles moving at practical velocities and at practical ranges this approximation is of no consequence.

Figure 22:
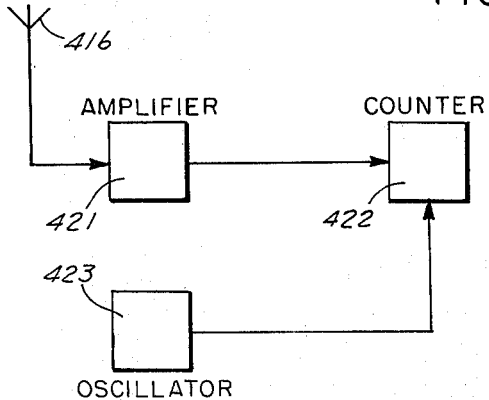
FIG. 22 is a schematic diagram of connections adapted to be used in a cycle counter station.

FIG. 22 shows another elemental doppler receiving and measuring station employing the technique of measuring the number of cycles that occur during a predetermined time interval. The time interval of the measurement is set by the period of the oscillator 423. In practice this oscillator would probably operate at a higher frequency than that required for the timing signal and would be reduced to that frequency by a scaler. However in principle the time duration of the count by counter 422 is set by the period of oscillator 423. The counter receives the arriving signal through antenna 416 and amplifier 421.

Several such stations may be employed to track a moving transmitter as described elsewhere in this application. The applicable equation relating count and displacement is shown in the explanation of FIG. 21. Receiving circuits of the types shown in FIG. 21 and FIG. 22 may be employed in many of the systems described in this application. They may be employed in conjunction with the phase locked oscillator described in FIG. 20. They may be employed in both the tracking and navigation systems and in single legged and double legged systems, and in systems where the frequency of the moving transmitter is not precisely known.

NAVIGATION SYSTEM EMPLOYING PULSES

Figure 23:
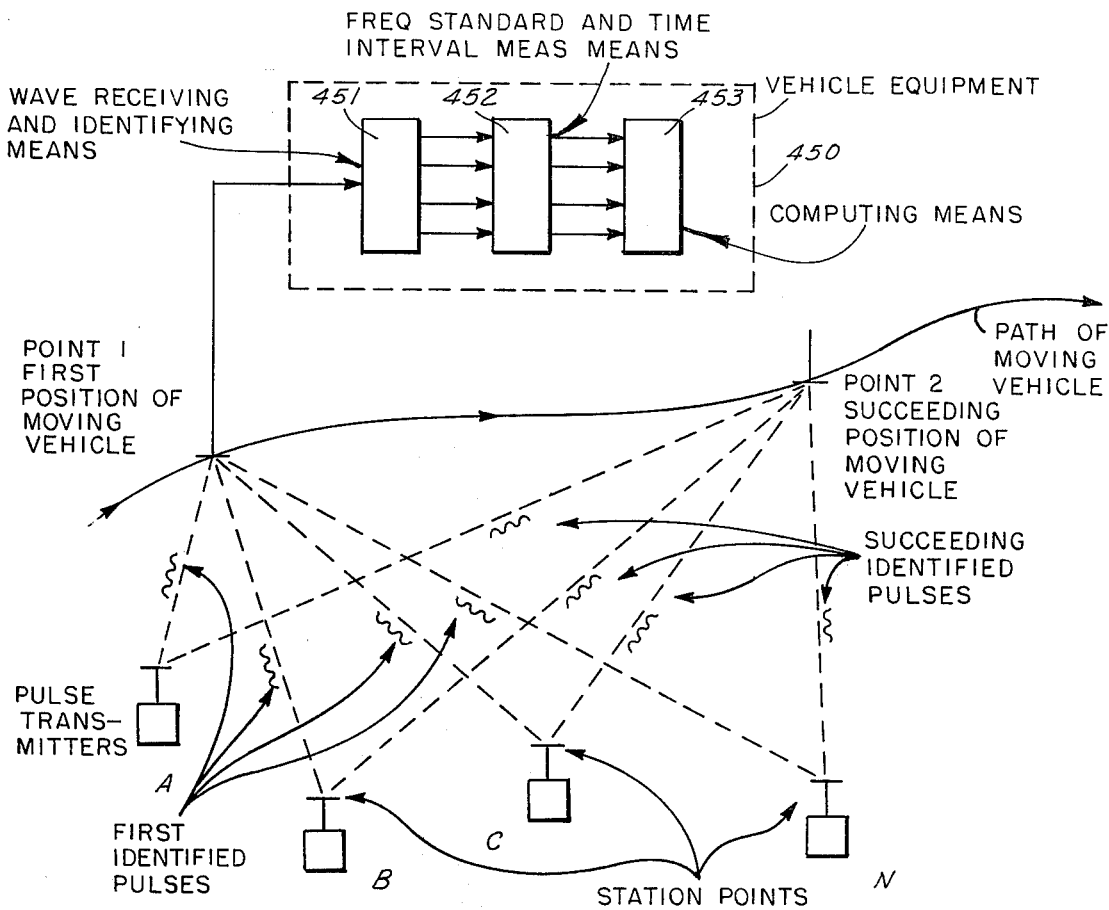
FIG. 23 is a diagram showing a navigating system employing pulses.

FIG. 23 shows a method of navigation employing the detection, aboard a navigating vehicle, of pulses transmitted from each of a plurality of transmitters. As explained elsewhere in this specification pulsed waves may be employed in such a navigation system as well as sine waves or modulated waves.

The Navigation System Employing Pulses shown in FIG. 23 combines certain features of the Navigation System, FIGS. 12, 13, 14, and 15, and certain features of the Tracking System Employing Light Pulses, FIGS. 7 and 8. Similar to both these other embodiments of the Applicant's invention, this Navigation System Employing Pulses employs a plurality of simultaneous measurements using a plurality of reference points each of which points is the location of a wave aperture; and, of course, there is a wave aperture on the moving vehicle.

The Navigation System Employing Pulses is similar to the Navigation System and dissimilar to the Tracking System Employing Light Pulses in that waves are transmitted, for the purpose of performing the required measurements, from the ground stations to the vehicle. The Navigation System Employing Pulses is similar to the Tracking System Employing Light Pulses and dissimilar to the Navigation System in that pulses are employed to make the required measurements.

Each position determination is achieved by the simultaneous performance of a plurality of measurements. One measurement alone is not sufficient for the determination of the position of the moving vehicle just as such a single measurement is not adequate for position determination in either the Navigation System or the Tracking System Employing Light Pulses referenced above. It is of course necessary to understand in detail the nature of the single measurement in order to understand how a plurality of such measurements is employed to determine the position of the moving vehicle.

Each measurement is performed by determining the time interval between the arrivals at the moving vehicle of a first wave pulse and a successive wave pulse. Both of these pulses are transmitted by the same station. This measured quantity is linearly related to the variation (change) of the distance between the single transmitting station and the vehicle, which variation occurs between the epoch of the reception of the first pulse and the epoch of the reception of the second pulse. This variation of the distance (change of range) is a direct consequence of the variation (change) of the position of the moving vehicle occurring between the first epoch and the second epoch. It is thus seen that the quantity actually measured, the time interval between the arrivals of the two pulses, is dependent upon the motion of the moving vehicle, i.e., the variation, (or more particularly the change) of the position of the moving vehicle occurring between the two epochs. One actually measures a quantity the time interval, that is linearly related to the variation of the distance; and thus this quantity actually measured is dependent upon the variation of the position of the moving vehicle.

The linear relationship between the variation (change) of the distance (range) and the measured quantity (time interval) is shown elsewhere in this specification. The manner in which the time interval between the arrivals at the vehicle of the first pulse and the successive pulse is measured is shown in FIG. 8 of this specification. This equipment is aboard the vehicle of course, rather than on the ground as in the case of the Tracking System Employing Light Pulses.

The process of performing a plurality of such measurements and the several options that are available in the configuration of stations and the number of measurements to be performed by each is explained in the specification relative to the Navigation System. It is readily seen that the distances (ranges) whose variations are measured as described above form the edges of a solid geometrical configuration of points. These points are of course the reference points which are the positions of the stations and the point which is the position of the vehicle. As the vehicle moves the geometrical configuration of points varies (changes), the distances (ranges) vary accordingly, and the time intervals described are linearly related to the variation of the ranges and are thus dependent upon the variation of the geometrical configuration. There is thus a relationship between the time intervals described and the positions of the moving vehicle at the epochs of the initiation and termination of the measurement. A plurality of such relationships defines these positions.

One may alternatively describe the operation of this modification of the invention in terms of a plurality of static geometric configurations of points. A first configuration of points exists which is a configuration comprising the locations of the stations (the reference points) and the vehicle at the epoch of the initiation of the measurement. A successive configuration of points exists comprising the locations of the stations (the reference points) and the location of the vehicle at the epoch of the termination of the measurement. There may be two or more of such configurations depending upon the number of stations employed. In this explanation of this modification of the invention there must of course be at least two configurations of points. The differences of corresponding parameters (the distances of ranges) of the successive configurations of points is dependent upon the differences in the shapes of the configurations. Each configuration corresponds to one of the above mentioned epochs at which the vehicle traverses that point of the configuration that is not one of the reference points, and each configuration has only one point that is not a reference point.

It should be clear that it is the variation of the configuration (or the difference between successive configurations) that produces the measureable phenomena, and permits thereby the determination of the configuration (configurations, in the above alternative explanation).

The transmitters must transmit their respective pulses sufficiently close together in time that the vehicle does not move sufficiently between the transmission of the first pulse corresponding to a given epoch and the transmission of the last pulse corresponding to that same epoch that the geometric model upon which the determination of position is based is destroyed. Such interstation synchronization is easily achieved either by timing means at each station or communication means between the stations. The critical item relative to the timing of the pulses is not the timing between the stations but rather is the timing between the successive emissions at each single station. This intrastation timing is easily accomplished by frequency reference means at each station.

FIG. 23 shows a plurality of pulse transmitters A, B, C . . . N which serve as beacons for the navigation of the vehicle. The vehicle equipment 450 is carried aboard the vehicle. The vehicle equipment 450 comprises receiving and signal identifying means 451. From these means signals corresponding to the signals of the several transmitters are fed into frequency standard and measuring means 452. In means 452 the time intervals between successive pulses from each transmitter are measured. The measured quantities from apparatus 452 are fed into computing means 453 for position determination. Means 453 convert the measured quantities into the cartesian coordinates of the first and successive positions of the moving vehicle corresponding to the epochs of initiation and termination of the measurements.

SURVEY ACCURACY ENHANCEMENT CAPABILITY

In common with other Polystation Doppler systems this modification of my invention has the capability of mapping its own station positions relative to one another. This capability is of importance in practical systems where time, terrain, economic, military, or other practical circumstances preclude the performance of a survey of the ground stations to the required accuracy by ordinary means. This capability of my invention makes this modification of my invention useful as a surveying tool quite apart from its usefulness as a method of navigation.

It is convenient in this modification of my invention to employ a recursive or iterative process in the automatic computational functions performed in the computer. In this particular case approximate values of the station positions are obtained by conventional means or from other known data. It is a function of my instant invention then to improve the accuracy of approximate values on hand. The system may be employed as a navigation system at the same time that it is performing this function of improving the accuracies of the values of the coordinates of the stations since approximate values are already on hand. As the process continues the accuracy of the system improves. The process is not necessarily limited to a single flight or pass over the station complex, for succeeding flights after the first can be employed to enhance the accuracy of the determination of the station point positions. Indeed separate simultaneous flights can be used to provide a faster rate of improvement if the data is communicated to a common point or if recorded doppler measurement data is brought to a common point of data processing subsequent to the occuence of the simultaneous flights.

SYSTEMS USING THE HIGHER TIME DERIVATIVES

The variations of geometric parameters includes not only incremental variations and first time derivatives but also the higher time derivatives of lineal geometric parameters such as ranges. Some of such systems and processes of my invention based upon determining the higher time derivatives comprise some dependence upon motion relationships. Other systems and processes of my invention operate entirely independently of any motion relationships.

Figure 24:
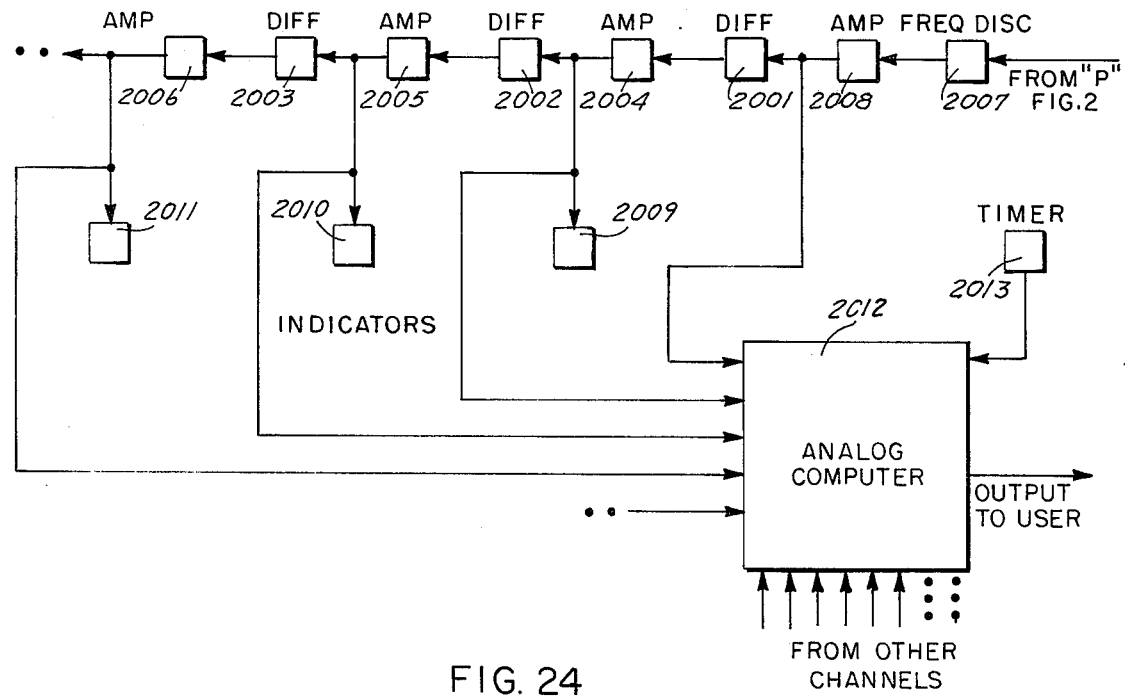
FIG. 24 is a schematic diagram of apparatus for determining time derivatives of ranges.

FIG. 2 and the text of this document elsewhere relative thereto show apparatus for the determination of the first derivatives of ranges. In another system the higher derivatives are derived from the signal at the input to the frequency meter 17, at post P in FIG. 2. FIG. 24 shows apparatus for determination of the higher derivatives of ranges. The apparatus comprises a series of differentiators 2001, 2002, and 2003 separated by amplifiers 2004, 2005, and 2006. The chain is driven by frequency discriminator 2007 through amplifier 2008. Discriminator 2007 is itself driven by a signal from the post P shown in FIG. 2 Indicators 2009, 2010, and 2011 are driven from the outputs of the amplifiers 2004, 2005, and 2006, as is the analog computer 2012. A timing signal is also fed to the computer 2012 from 2013. This timing signal is not a part of the measurement process, or determining process, but merely serves in the coordination of the position determining process. From the data fed into it from the integrators corresponding to the several stations of the system, the computer 2012 determines for its output at least one dimension of the position-motion state of the moving target object.

Figure 25:
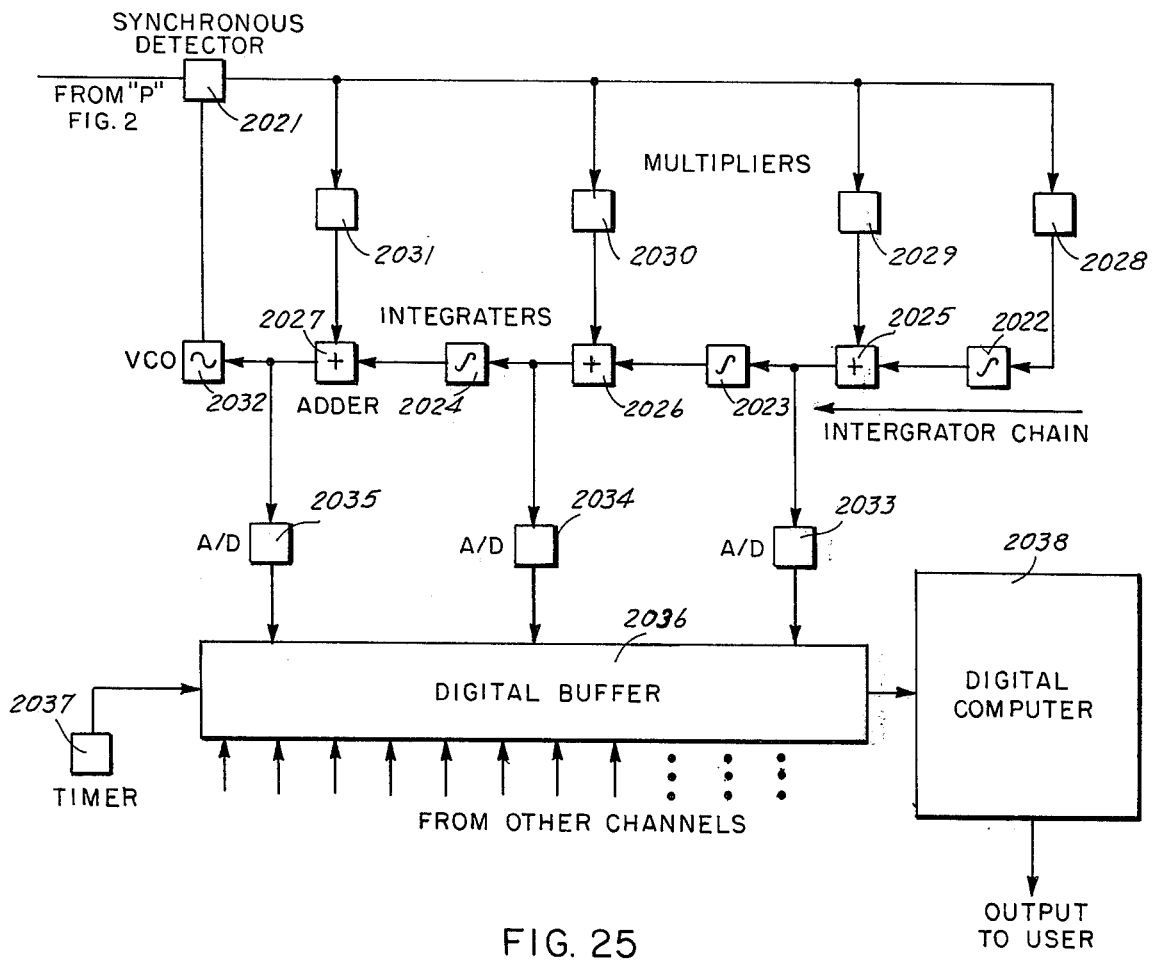
FIG. 25 is a schematic diagram showing another form of apparatus for determining time derivatives of ranges.

FIG. 25 shows an alternative apparatus for obtaining the required time derivative information relative to a lineal geometric parameter, the range, and feeding this information into a computer to obtain at the output of the computer at least one dimension of the position-motion state of the moving target object. Synchronous detector 2021 is driven by a signal from the Post P in apparatus such as that FIG. 2. A chain of integrators 2022, 2023, and 2024 separated by adders 2025, 2026, and 2027 is driven by the output of synchronous detector 2021 through multiplier elements 2028, 2029, 2030, and 2031. The output of adder 2027 drives voltage controlled oscillator 2032 whose output in turn drives the input of synchronous detector 2021. The outputs of the adders 2025, 2026, and 2027 representing respectively the third, second, and first derivatives of the frequency with respect to time are converted to digital information by analog-to-digital converters 2033, 2034, and 2035 and thence fed to digital buffer 2036 where it is combined with identification signals from timer 2037. The output of the buffer comprising the identified digital time derivative data is fed to the digital computer 2038. The computer 2038 computes automatically at least one dimension of the position-motion state which appears at the output.

Either of the above two systems may be extended to operate with time derivatives of any practical order.

Each of the above two systems determines the values of quantities linearly related to variations of geometric parameters. These variations in these cases are the time derivatives of the distances from the station points to the target point. Thus variation of the geometry of the system, the geometrical configuration formed by the station points and the target point, is sensed by the apparatus which uses the data so determined in either analog or digital apparatus to determine at least one dimension of the position-motion state of the point representing the moving target object. In these particular systems a dimension of the position-motion state can be the range from a station point, one of the cartesian coordinates of position, or one of the time derivatives of one of these.

Mathmetics of Processes Involving the Higher Time Derivatives

Differentiating with respect to time the expression for the radial velocity in terms of frequency, one derives the following expressions for successive derivatives of the radial velocity:

$$\dot{V} = \frac{dV}{dt} = -\frac{f_0 \dot{f}_e C}{(f_o + f_e)^2}$$

$$\ddot{V} = \frac{d^2V}{dt^2} = -\frac{4\dot{f}_e - 2\ddot{f}_e(f_o + f_e)^2}{(f_o + f_e)^2} f_o C$$

Simpler approximations result when the velocity of the vehicle is small compared to the velocity of propagation of the waves:

$$\ddot{r} = \dot{V} = -\frac{C}{2f_o}\dot{f}_e$$

$$\dddot{r} = \ddot{V} = -\frac{C}{2f_o}\ddot{f}_e$$

$$\ddddot{r} = \dddot{V} = -\frac{C}{2f_o}\dddot{f}_e$$

Using the determinations of radial velocity and the time derivatives of radial velocity, all measured simultaneously relative to all of the stations one is able to calculate the position of the vehicle at the time of the measurements. All of the corresponding time derivatives of the postion of the target point may also be computed.

In terms of the cartesian coordinates, employing designations as shown elsewhere in this document, the following relationships may be employed in automatic computing equipment to determine position and the derivatives thereof;

$$r = (x - a)^2 + (y - b)^2 + (z - c)^2$$

$$r\dot{r} = (x - a)\dot{x} + (y - b)\dot{y} + (z - c)\dot{z}$$

$$r\ddot{r} + \dot{r}^2 = (x - a)\ddot{x} + (y - b)\ddot{y} + (z - c)\ddot{z}$$

$$3r\ddot{r} + \dot{r}\ddot{r} = 3\dot{x}\ddot{x} + 3\dot{y}\ddot{y} + 3\dot{z}\ddot{z} + (x - a)\dddot{x} + (y - b)\dddot{y} + (z - c)\dddot{z}$$

$$4r\dddot{r} + 3\ddot{r}^2 + \dot{r}\dddot{r} = 4\dot{x}\dddot{x} + 4\dot{y}\dddot{y} + 4\dot{z}\dddot{z} + 3\ddot{x}^2 + 3\ddot{y}^2 + 3\ddot{z}^2$$
$$+ (x-a)\dddot{x} + (y-b)\dddot{y} + (z-c)\dddot{z}$$

As many of these equations as are necesary for each station may be obtained, and a set of these relationships exists for each of the stations of the system. The unknowns of these equations are the cartesian coordintes of the target point position and the derivatives of these coordinates with respect to time. It is desired to determine at least one of these unknowns, and such a determination may be made when the number of independent equations available for the automatic computation procedure equals or exceeds the total amount of unknowns.

In three dimensional space a minimum of four stations are employed in some versions of my invention to determine at least one dimension of the position-motion state of the moving target point without employing motion relationships. For four stations the determination of the derivatives up to the third is required of the ranges of each of the four stations. There are then four sets of three equations each, and there are twelve unknowns after the ranges have been eliminated.

If four stations are located in a plane it is possible to obtain any number of independent equations corresponding to any chosen target point merely by differentiating repeatedly with respect to time the expression relating the squares of the four simultaneous ranges to each other:

$$\sum_{i=1}^{i=n} \alpha_i r_i^2 = K$$

$$\sum_{i=1}^{i=n} \alpha_i r_i \dot{r}_i = 0$$

$$\sum_{i=1}^{i=n} \alpha_i (\dot{r}_i^2 + r_i \ddot{r}_i) = 0$$

$$\sum_{i=1}^{i=n} \alpha_i (3\dot{r}_i \ddot{r}_i + r_i \dddot{r}_i) = 0$$

$$\sum_{i=1}^{i=n} \alpha_i (4\dot{r}_i \dddot{r}_i + 3\ddot{r}_i^2 + r_i \ddddot{r}_i) = 0$$

where:
$n$ is the number of stations
$r_i$ is the range from the i th station to the target point
The $\alpha_i$'s and the $K$ are constants determined by the geometrical distribution of the station points.

Simultaneous solution of four of these equations yields the unknown ranges. If five stations are employed the stations need not be located in a plane, and five of the equations must be employed. Further discussion of the use of his relationship between the squares of the ranges, apparantly first discovered by the applicant, is to be found in the applicant's patent application Ser. No. 86,770 referenced elsewhere in this document.

In the practice of my invention electrical signal quantities such as phase, frequency, time delay, and the variations thereof are generally converted in the computer to geometrical quantities such as ranges, the algebraic sums thereof and the variations of these. There is great flexibility as to where and how the conversion of such dimensions takes place within the total data processing functions within the computer. The constants required for these conversions are inserted into the computer as are such other required ancillary data such as the coordinates of the station points using well known means and methods. These are the frequent practices of my invention whether the particular system is of the rate type or of the incremental (displacement) type or some hybrid thereof. Other methods of introducing this ancillary data may be employed as well in the practice of my invention.

Although the discussions of rate type modifications of my invention have been centered around the one-legged type of system with wave transmission both to and from the target point, it is evident by analagy to other types of systems disclosed herein that other geometries such as those involving two-legged lineal parameters and other wave transmission such as only to, or such as only from, the target point are also comprised by my invention.

MAPPING

As in the case of Polystation Doppler systems employing incremental type measurements, Polystation Doppler systems employing rate type measurements when properly arranged also have the capability of determine the positions of the reference points (stations, beacons, etc.) Of course in each nonredundant system the number of measurements required is greater when the positions of the station points are to be determined than it is when only the position of the moving target object is to be determined. In the case of the rate type system these additional measurements can be achieved by performing measurements of more orders of derivatives of the lineal quantities whose variations are sensed.

As in the incremental types of systems it is only necessary in the rate type of system to treat the station coordinates as variables instead of as constants in the automatic process of extracting the desired information from the defining equation set (solving the equations).

Additional measurements may be obtained by increasing the number of stations (reference point) even though the positions of these reference points is unknown. It is of course necessary that the number of the orders of the derivatives measured at each station be great enough that the number of unknowns acquired by the addition of the station to the system is less than the number of measurements added, in nonredundant systems.

DIGITAL PROCESSES

The manner in which digital processes can be used in my invention are so varied and so flexible that it is not possible to be at all comprehensive here in showing them.

It was old, at the time of the filing of the patent application Ser. No. 86,770 of which this patent application is a continuation in part, to employ, as parts of a complete system comprising nondigital elements, digital data processing and digital computers coupled to sensing apparatus such as radio receivers, accelerometers, temperature guages displacement guages, rotation velocity guages, speedometers, used singly, in plurality, or in combination. Such systems had been evolved for navigation, tracking, and industrial processes of all sorts. The methods of coupling the digital machine to the sensing apparatus were old and well established. Some sensing elements such as the pulse integrating gyre and the doppler frequency counter were remarkably adapted to digital operation by their inherent properties. Other sensing elements provided data outputs requiring the use of separate analog-to-digital converters in coupling the analog sensor element to the digital data processing element. These analog-to-digital converting elements were highly developed in the art at that time.

My invention is well adapted to employment of digital data processing and the digital computer either using sensing elements inherently digital in character such as the cycle counter or using other sensing elements with the analog-to-digital converter. Suitable digital computers which may be employed, for example, include the IBM 704 amd the IBM 7090, both of which were in existence well in advance of the filing of the present application. Additionally, the IBM 7090 was in existence well in advance of the filing date of parent application Ser. No. 86,770, now U.S. Pat. No. 3,691,560.

Functional elements of my invention that are particularly suitable for the application of digital techniques are signal tracking, spectrum analysis, signal selection, filtering, correlation, counting, integrating, differentiating as well as all of the more common mathematical functions. (see my U.S. Pat. No. 3,242,487 for discussion of this subject.)

Figure 26:
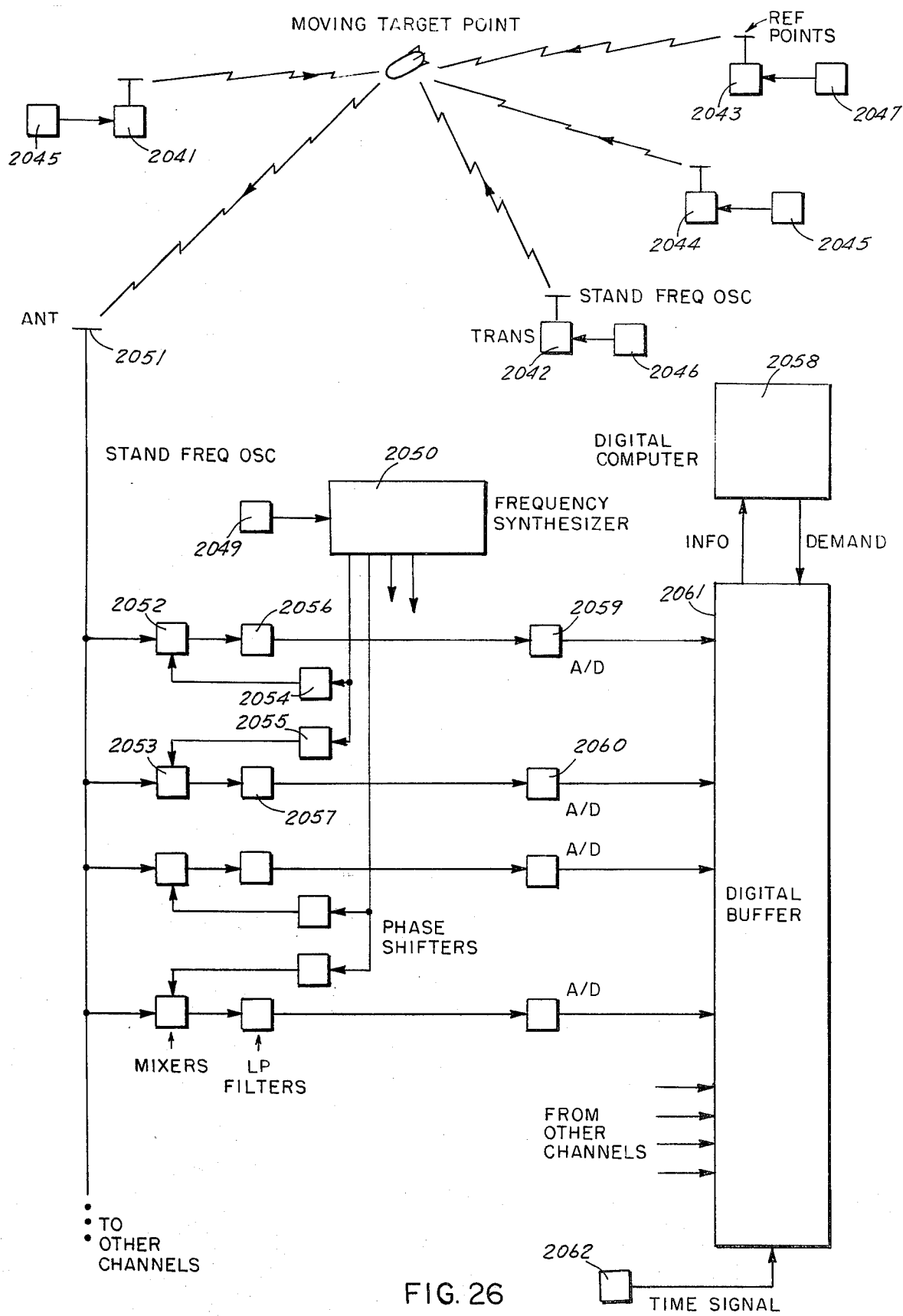
FIG. 26 is a schematic diagram of a receiving system and associated digitally-operated apparatus for digital processing of data.

FIG. 26 shows a receiving system and its associated digital apparatus. This apparatus is intended to be employed in those types of systems employing multiple spaced transmitting means and a single receiving equipment located at a single point along with the data reduction apparatus. The system may be a navigation system, in which case the receiving and computing apparatus is located aboard the navigating vehicle. The apparatus may as well be employed in a reflective type of system or a system employing a coherent transponder, in which case the receiving apparatus is located at a point, either vehicular or stationary, remote from the target object or vehicle that is being tracked (at least one dimension of whose position-motion state is to be determined).

In this particular system waves are transmitted from the wave emitters 2041, 2042, 2043 and 2044 which are stabilized by standard frequency oscillators 2045, 2046, 2047 and 2048 respectively. Each standard frequency oscillator is adjusted to a separate frequency sufficiently remote from that of the others that the anticipated doppler spectrums do not overlap. This system employs a two-legged geometry operating with a reflective target. The transmitters and the receiving station are so separated that the direct signal from the transmitters is not available at the receiving site, and an independent standard frequency oscillator 2049 is used at the receiver. Oscillator 2049 drives a frequency synthesizer 2050 which provides a set of signals, each signal being equal to that of one of the transmitters. The signals of all of the transmitters reflected from the moving object enter the receiving apparatus through the wave aperture 2051 (antenna in the case of radio waves). Separate two-phase detecting circuits are employed, one corresponding to each transmitter, and each receiving a separate synchronizing signal from the frequency synthesizer 2050. Other than that they are fed separate synchronizing signals of different frequencies and provide separate outputs, the separate homodyne circuits are identical, and all receive the same spectrum of signals from aperture 2051.

Each homodyne circuit comprises a pair of input mixers 2052 and 2053, which is fed the signal from the aperture 2051 and the appropriate signal from the frequency synthesizer 2050 through the pair of phase shifters 2054 and 2055. The outputs of the pair of phase shifters 2054 and 2055 are ninety degrees out of phase with each other. The output signals of the two mixers 2052 and 2053 are ninety degrees out of phase with each other and are fed respectively to low pass filters 2056 and 2057. The filters 2056 and 2057 are of sufficiently low cutoff frequency that the reflected doppler altered signals from transmitters other than the one whose reflected signal is being tracked through the particular homodyne circuit are effectively eliminated. The two-phase output signal from the filters is the entire anticipated doppler spectrum corresponding to the propagation path from the corresponding transmitter point to the moving object point and thence back to the receiver point. No tracking of the reflected signal is accomplished up to the output of the filters 2056 and 2057. The entire tracking operation is actually accomplished in the computer 2058 which is coupled to the output of the filters 2056 and 2057 through analog-to-digital converters 2059 and 2060 and digital buffer element 2061. The buffer 2061 is fed a digital timing signal from timer 2062. A function of the buffer is to assign the appropriate timing dimension to each individual signal sample from the analog-to-digital converters 2059 and 2060 and to feed the digital signals now properly coded with respect to time to the computer 2058 upon demand from the computer.

The computer performs the function of signal tracking and performs the function of determining the values of quantities linearly dependent upon the variations of the several wave propagation paths of the signals from the separate transmitters reflected by the moving object ot the receiving aperature 2051. The computer then multiples this data by the appropriate constants to convert the data to represent the variations of the lineal dimensions of the algebraic sums to ranges. These converted data are then employed in further digital process within the computer to determine simultaneously the mutually relative positions of the several transmitters of the system and the corresponding dimensions, or combination of dimensions, of the position-motion state of the moving object. The internal workings of the digital computer 2058 are such that the system operates either in an incremental mode (displacement mode) or in a rate mode, according to the teachings elsewhere in this disclosure.

REDUNDANT SYSTEMS

Any of the systems described in this specification can be arranged, or programmed, to employ redundancy. Under redundant conditions the station position dimensions and position-motion state dimensions which are to be found simultaneously are actually "over determined" by total number of measurements performed relative to that determination. More measurements, more restrictions and/or more conditions, are applied than is required for minimum determination. Such over determination or redundancy can be achieved whether the system employs analog or digital data processing. A sample of the application of an analog computing system for use in a triangulation type of multistatic system is shown in U.S. Pat. No. 2,535,942 issued to J. H. Lewis et al, Dec. 26, 1950, entitled: Electric Direction Finding Evaluation. Similar arrangements for combining redundant data into a system for surveying, mapping, "self surveying" using the Polystation Doppler methods set forth herein are obtainable following the known art for combining such data.

NOTE ON MATHEMATICS

Figure 28:
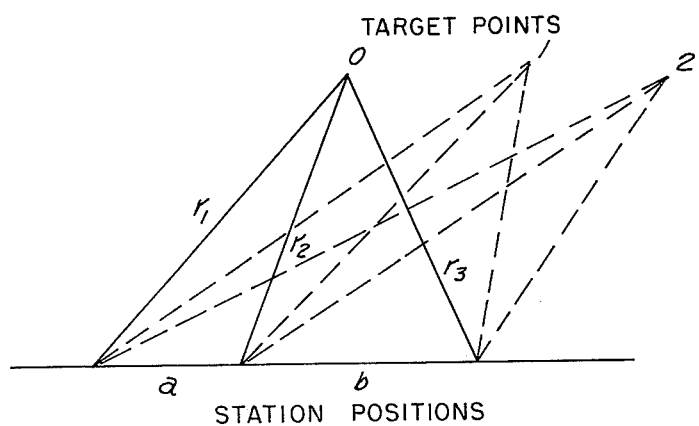
FIG. 28 shows a system of stations used in demonstrating a closed mathematical solution for dimensions of position of said stations.

A very simple system may be considered to demonstrate closed solution for dimensions of position of fixed stations. In this system the number of dimensions of relative position of the stations is reduced to one by placing the stations in a straight line while the target moves in two dimensions as shown in FIG. 28. The range squares invariant for three stations in a straight line can be written as follows were a and b represent the distances among the stations as shown:

$$\frac{r_1^2}{a} + \frac{r_3^2}{b} = \left(\frac{1}{a} + \frac{1}{b}\right) r_2^2 + a + b$$

From this equation employing a single set of simultaneous doppler measurements, $M_1$, $M_2$, one measurement from each station, the following equation, linear in its unknowns, can be written. The unknowns are shown in the brackets:

$$2M_1 \left(\frac{b}{a+b} r_1\right) + 2M_2 \left(\frac{a}{a+b}\right) r_3 + \left(\frac{b}{a+b}\right) M_1^2 + M_2^2 \left(\frac{a}{a+b}\right) - 2M_2 r_2 = M_2^2$$

Employing five contiguous sets of such measurements the unknowns can be determined by the solution of a set of five linear equations. Performing the obvious divisions one obtains the ranges $r_1$, $r_2$ and $r_3$ along with the ratio A of the distances between the stations:

$$K_1 = \frac{b}{a+b} \qquad \frac{a}{b} = \frac{+K_1}{.K_1} \quad A$$

Substitution in the original invariant one obtains the distance by obvious manipulation.

$$\frac{1}{A} r_1^2 + r_3^2 = \left(\frac{1}{A} + 1\right) r_2^2 + \quad A + 1 \quad b^2$$

$$b^2 = \frac{\frac{1}{A} r_1^2 - \left(\frac{1}{A} + 1\right) r_2^2 + r_3^2}{A + 1}$$

SUMMARY

Particular examples of my invention are presented in this Specification. It is obvious that the basic principles of my invention, resultant of my discovery of the Polystation Doppler relationships, can be applied in the creation of a wide variety of systems for mapping the positions of stationary objects, stations, beacons, or other such reference points. The methods of my invention may also be employed for determining the positions of moving reference points provided the positions of such reference points are under some restraint whose characteristics are known.

In the practice of my invention at least one element of the system, an aircraft, satellite or other vehicle must move in the vicinity of the complex of reference points, or such motion must be simulated. The system may employ a single vehicle on a single trip or pass, or the system may employ a number of vehicles simultaneously on single or multiple trips or passes. The data may be redundant or nonredundant. Where redundant data is taken the redundant data may be added or incorporated into the position determinations in piece meal fashion in accordance with weights computed on the basis of the data itself.

Figure 27:
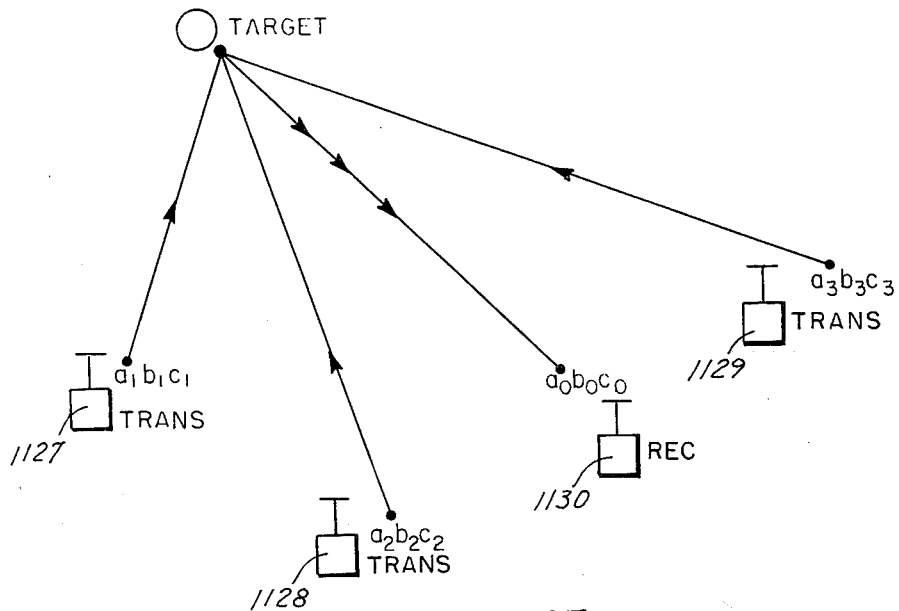
FIG. 27 shows a two-legged system for tracking reflecting targets and comprising three illuminating transmitting stations and a single receiving station.

Operation may be in either two-dimensional space or in three-dimensional space, the number of stations varying accordingly. Wave transmission may be toward the moving vehicle from the reference points. For example receiving equipment may be installed aboard the moving vehicle sensitive to waves emitted by transmitter means located at the reference points. This circumstance might correspond to the application of a navigation system. My invention may be employed with a moving transmitter which then becomes the moving object or vehicle. Receiving apparatus located at the reference points and connected to a single computing apparatus completes the system. Further options exist in reflective systems. For instance one may employ a single transmitter to illuminate the moving reflecting object and employ receivers at the reference points to detect and measure the waves reflected from the moving object. The illumination transmitter may be at one of the reference points or elsewhere. FIG. 27 shows a system in which the illumination is furnished by three transmitters, one located at each reference point. A common receiving equipment is located at a point remote from any of the reference points. Obviously the receiving equipment must be sensitive to the reflected emanations of all of the transmitters, i.e., it must have three channels or the equivalent thereof. The receiver could be located at one of the reference points without change of my invention. FIG. 1 shows the system arranged so that each reference point is the location of a transmitter-receiver combination so that illumination of the moving reflector is provided at each reference point from the receiver located at that reference point. This system might well be augmented by a transponder aboard the moving vehicle.

While modification of my instant invention shown in FIG. 27 has four stations it is obvious that there are only three doppler loops or wave paths in this three-dimensional system. The system comprising the positioning of one terminal of the communications loop remote from any of the three primary reference points at which are located other terminals of the three essential wave paths is a modification of the same instant invention as is modification employing a transmitter in the vehicle and three receiving stations at the reference points.

An obvious variation of my invention is the use of multiple receiving channels at each of the stations (reference points) shown in FIG. 1. One channel at each station detects the echoed signals of the co-located transmitter while the other channels detect the echoes of the transmitters located at the other reference points (station). Such a system would comprise both one-legged and two-legged wave transmission paths. Further obvious variation is the omission of any receiver channel sensitive to the signals from the co-located transmitter. Such a system would comprise only two-legged wave transmission paths.

In order to be descriptive of the invention in brief and without recitation of the vast number of possible combinations one may simply state that wave means are located at each reference point. My invention is invarient as to whether these wave means are transmitters or receivers or both. It is obvious that the moving object may be a reflecting object as it would be in the case of a missle detection system. It is also apparent that wave means on board the moving object or vehicle can be a transmitter or a receiver depending upon the purposes of the particular Polystation Doppler system, i.e., air traffic control, air navigation, etc.

An essential element of my invention is the transmission of waves across the space between each reference point and the moving object, no matter which direction the waves travel. It is further essential that the waves be detected and their doppler characteristic or its equivalent be measured or sensed.

The particular geometric parameter whose variation is determined by the basic sensing elements of my invention can be either a range, a sum of two simultaneous ranges, or the difference of two simultaneous ranges. It is only essential that some signal quantity that is linearly dependent upon at least one range variation be sensed, measured, or observed. A variety of means for measuring various signal quantities linearly related to the appropriate parameter variations are shown in this specification including cycle counting, time between arrival of pulses, etc.

The particular type of variation of geometric parameter can be either the incremental type or the rate type. The incremental type of variation of a geometric parameter involves two separate points along the path of the moving object and is equivalent to the difference in the two values of each geometric parameter associated with these two points, the difference of two ranges, the difference of the sum of two ranges, the difference of the difference of two ranges. When the geometric parameter comprises two ranges it is of course necessary that there be two reference points (wave stations) associated with that particular geometric parameter. When the parameter is a simple range only a single wave station is required.

My invention is entirely dependent upon the simultaneous sensing, measurement, or observation of variations of a plurality of separate simultaneous geometric parameters. Therefore the apparatus of my invention comprises means for operating the separate sensing, measuring, or observation means essentially simultaneously.

In some of those modifications of my invention which employ incremental type measurements, sensing, or observations it is necessary that means be employed to accurately govern the duration of each measurement, sensing, or observation so that it is as nearly identical as can be achieved to the durations of all of the other simultaneous measurements, sensing, or observations.

Apparatus for maintaining simultaneity and similarity of duration is shown and described in this specification for use in these particular modifications of my invention. The specific apparatus varies with the precise nature of the particular system. In some instances a separate frequency standard is maintained at each of the several wave stations. In other embodiments a standard frequency signal is transmitted to the several wave stations from a common source. Simultaneity is maintained easily where the receiving elements are located at the same place, either in the moving object, (as with navigation) or at a cooperating wave station. In other modifications of my invention a synchronizing signal is transmitted to various receiving wave stations. In certain pulse type stations the waves used in the doppler measurements, sensing or observations provide themselves the needed synchronizing signals.

Means and methods other than those of C. W. doppler exist for determining the variations, either rates or increments, of wave propagation paths, and these means and methods are employed in certain embodiments of my invention. Range rate information is available at the motor control of the Range Unit of the SCR-584 gun laying radar, and range variation information obtained in any such manner as this is useable in the indicated modifications of my invention. Any device basically capable of sensing propagation time delay can be modified to sense the variation of such time delay. For example the system called Doppler-Free Distance Measuring system described in U.S. Pat. No. 3,175,214 to W. R. Ramsay et al can be adopted to provide range rate information by applying a time diferentiator element to the range output indication signal or by taking the difference of successive range indications in a digital element, or some similar procedure. Higher ordered time derivative information can be derived directly from integrators in the control loop of a pulse delay time tracker, or a continuous wave phase tracker as shown in this specification. In the showing of such a circuit (See FIG. 25) the showing of a.g.c. and/or limiting elements is omitted for simplicity. The two-phase detection circuit shown elsewhere in this specification offers many advantages in this part of the detection system relative to a.g.c., limiting, and linearity of phase detection. However the simpler model of the loop is shown in FIG. 25 for clarity and brevity. It must be emphasized that this type of loop providing as outputs the time derivatives of the different orders can be applied to any such tracking device and is not limited to the C.W. phase locked loop. Whereas higher order phase locked loop circuits are well known in the art, the derivation directly from the loop of the time derivatives of different order simultaneously and the simultaneous use of the multiple output of the tracker so derived in subsequent apparatus for determining the dimensions of the position-motion state is a part of my invention. For the purpose of measuring variations the apparatus need not be calibrated or otherwise adjusted to determine actual range, a marked convenience in some applications. Variation determining elements employing C.W. radiation are used in certain embodiments of my invention, as well as f.m., a.m., frequency swept, sawtooth waves, pulsed waves etc. Signal trackers involving tracking loops such as shown in FIG. 25 and elsewhere are employed in various modifications of my invention for tracking such signals.

My invention comprises in some of its embodiments the placing of a standard frequency oscillator at each of the wave stations of the system. There are at least two reasons for such use of separate frequency standards instead of use of common standard frequency source with appropriate communications equipment to transmit the reference signal to the various wave stations. One of these reasons is convenience and economy in avoiding the necessity of the frequency signal links. The other is the difficulty of maintaining frequency communication links of the phase stability desired in the more accurate embodiments of my invention. In general it may be said that for shorter baseline systems the use of communications means is the more practical method. When the baselines are longer the use of separate standard frequency sources must be relied upon to attain the greatest accuracy. Both methods of attaining the reference frequency are described in this specification as well as systems (See FIG. 1) in which no frequency or phase relationship among wave stations is reauired.

The best frequency signal or doppler signal, being of much lower frequency than the reference and operating signal frequency, is not so vulnerable to the instability of the communications means and may be transmitted thereby for completion of the measurement at a central point without undue requirements being placed upon the communications link. Therefore the measurements of phase variations of the best signal or doppler signal can be carried out conveniently at a central point. To reduce the load on the communications system the measurements may be completed at the sites of the separate receiving wave stations employed in some modifications of my invention, the measured value then being transmitted to a central point. This specification shows both processes employed in separate embodiments of my invention. It is a part of my invention to employ separate standard frequency oscillators (frequency standards) at each wave station in those embodiments of my invention where it is appropriate to do so.

In some modifications acquisition of the signals of the target object is a part of my invention. When the signals are of reduced amplitude such as usually occurs in a reflective type system, the signals must be separately tracked by gating or narrow filtering means in order to be measured. (This condition is not true in those systems where sufficient signal strength exists as in some of the embodiments of my invention shown in this specification.) In some embodiments, where the signals are of such low intensity, scanning means are employed to lock on separate frequency trackers. Coordinated signals for such scanning are achieved in some modifications of my invention by computer scanning means which simulate in effect the signals of an anticipated typical real target. Correlation between these signals and the signals associated with the several wave stations is attempted and when this correlation is sufficiently great tracking is initiated. This scanning function not only provides signal acquisition for the tracking loops but also provides initial conditions for the commencement of the iterative or recursive computations for determining the dimensions of the position-motion state from the measured or sensed quantities. This combined scanning process also serves to help group the echoes according to their respective targets. In other embodiments of my invention signal acquisition is separately accomplished by each sensing means, using processes well known in the art.

All of the functions described here, scanning, acquisition, tracking, and indication of the state dimensions can be accomplished in either analog or digital machinery properly programmed.

It was old at the time of the filing of the patent application Ser. No. 86,770 that the doppler effect is observable with all types of waves: continuous waves, tone modulated waves, speech waves, TV waves, music waves, noise waves, pseudorandom waves, pulsed waves, pulse coded waves. These waves may be radio waves (electromagnetic) or they may be transmitted acoustically or by other sound waves in any suitable medium. It was similarly old that doppler measurement, observation, or sensing can be performed using any of these wave types in almost any medium permitting the necessary motion between source and receiver. My invention may also be practiced employing waves of any convenient length, from those of very low subaudio frequency to those of light. In certain applications of my invention it is desired that the detectable radiation not extend far beyond the limits of the operational boundries of the system. Such operation can be approximated by employing magnetic waves rather than the ordinary radio waves. Similarly, under suitable conditions, electric waves can be employed. Such waves fade much more rapidly with the propagation distance than do radio waves.

It was old at the time of the filing of the patent application Ser. No. 86,770 to select the particular wave form most suitable in performing a doppler measurement for a particular application. Continuous waves are the most conspicuous choice and usually the first considered. However such waves are not always the most suitable in a given application. For instance it was old at that time to employ a wave that was square-wave modulated between full on and completely off. Using such a wave it is not ncessary for the transmitter of a station to be on at the same time that a receiver at the same station is receiving, thus the interference of the transmitter with the doppler receiver is eliminated. Other coding of the wave signal employed can be, and have been, used to mask the signal in warfare applications, to distribute the spectrum of the signal to accommodate atmospheric characteristics, etc. Any of these techniques and wave forms may be employed to sense the variation of the geometric parameters such as ranges, range sums, or range differences as described in this specification.

The accuracy and resolution provided by my invention of Polystation Doppler is such as to make feasible the physical interception of mortar shells, rockets, bombs, artillery rounds while these are actually in flight. With my invention the path of the shell can be so accurately determined and so accurately extrapolated that destruction of the missile by counterfire while the missile is still in flight is feasible. Weapons of sufficient accuracy are available to provide the required defensive fire. This capability of my invention was clearly evident at the time of filing of the application Ser. No. 86,770. It is evidence of the particularity of my invention that the same embodiment of my invention can also be used for detecting and accurately tracking aircraft, guiding missiles and similar applications.

My invention may be employed to map the positions of Polystation Doppler system such as the mortar locator. In such usage the purpose of the use of the invention is ancillary to the main purpose of the system to which it is applied. On the other hand my invention may be applied for the main purpose of charting or mapping. In the case where the mapping is ancillary to the functioning of a Polystation Doppler system whose primary function is other than that of mapping the sensing apparatus is generally already in place and the only changes of apparatus may be limited to changes in the computing elements of the system. However other changes in the system to aid in the mapping or self-survey function may be implemented. As an example, a transponder may be put on an aircraft which may then be flown through the operational field of a Polystation Doppler Mortar Locator in order to provide suitable signals and optimal sky point positions for the performance of the mapping function by the system. The only changes in the ground system then being in the computer. The main purpose then is to track mortar shells. To provide maximum accuracy, the positions of the stations must be determined with maximum accuracy. My invention applied to the system makes possible the achievement of station position determination with the required accuracy at minimum expenditure of time and effort.

In some applications of my inventions approximate positions of the ground stations are known. My invention may then be employed to enhance the accuracy of the determination of the positions of the ground stations.

My invention may be applied without any reliance on ballistic properties of motion such as discussed in my U.S. Pat. application Ser. No. 74,180 made en toto a part hereof by reference. On the other hand where such information of adequate reliability is available one skilled in the art will have no difficulty incorporating the use of such information into the function of my invention. The procedure is ordinary and in accordance with the teachings herein and in the incorporated patent application. Ballistic information is obtainable both as a priori knowledge obtained exterior to the system or method of my invention and as information derived from the doppler tracking elements themselves. For instance the highest effective order of derivatives of cartesian motion may be obtained from a narrow band tracking filter or phase locked loop circuit. The "order" of the loop and the recorded error can be employed to ascertain the highest significant degree of the variation of the lineal parameters. A series of measurements of the lineal variations similarly can be employed by application of the appropriate mathematical series to determine the degree of the variation. Having determined the degree of the variation of the lineal parameter such as ranges or algebraic sum of ranges it is easy to determine the degree of the cartesiam variation; and from there it is an obvious step to apply suitable physical representations of the appropriate motion constraints into the computer.

Motion constraints of this type may be applied either to the station in motion relative to other stations or to the vehicle in motion relative to the stations.

RECORDING MEANS AND THE USE THEREOF

Most frequently a mapping or surveying operation is not of such a character as to require the achievement of the end result, position determination, in "real time". As a consequence of this relative freedom from the pressure of time it is appropriate in my applications to employ recording means at one or more points in the method, the system, or the process. Such recording can be achieved through tape recording, recording on drums or disks or the like. Such recording means may be employed to record the received wave signal in a linear fashion so that measurements may be performed on the signal at a later time. Alternatively the recording means may be used to record the measurement data so that such data may be fed into a computer for computation of position-motion state at a later time.

A particularly economical surveying system is achieved by deploying radio beacons across the landscape to be surveyed and detecting and recording the signals from the beacons using a magnetic tape recorder aboard the moving aircraft. After the flight of the aircraft, the recording derived by the recording means may be "played back" into signal tracking and measuring means using suitable "play back" means. In this manner only light portable equipment is required aboard the aircraft and as many of the functions of the system as possible are retained on the ground. Using this type of my invention it is possible to employ a general purpose digital computer, properly programmed, to be the signal tracking means and the measuring means in addition to being the means for determining position-motion data from the measured data. To arrange the system in this manner it is only necessary to employ analog-to-digital converters at the output of the play-back means and to feed the output of the converters to the digital computing means used for the tracking function and the measuring function. Essentially in practical systems these last two functions are combined. All of the functions of signal acquisition, tracking, measuring, and position-motion determination can be carried out by a single general purpose digital machine operating from the outputs of the analog-to-digital converters.

NUMBERS OF STATIONS AND THE USE THEREOF

It is contemplated in many applications of my invention to employ a very substantial number of wave stations. For the purpose of illustration in this specification practical systems have been described having but a limited number of stations. In practice the number of stations depends upon the operational procedures, the computation mechanism, the degree of redundancy desired as well as the circumstances under which the invention is to be employed and the objectives of each application.

AMBIGUOUS AND UNAMBIGUOUS WAVES AND THE USE THEREOF

The terms "ambiguous wave", "unambiguous wave", "ambiguous waveforms", unambiguous waveforms" are so well understood in the navigation, radar, and tracking arts that it seems hardly necessary to make further definition here. The unambiguous wave is a wave that is longer than the propagation distance over which it is to be used. The ambiguous wave is a wave that is shorter than that propagation distance. The wave referred to may be a wave of the modulation envelope or may be the carrier. The wave may be a pulse wave in which case one generally refers to an ambiguous or unambiguous pulse period or the equivalent pulse repetition frequency. Any of these wave forms may be employed in the practice of my invention, the desirability of the use of any particular waveform and whether or not the wave is ambiguous in the operating distances of the system is a subject which is determined by the exigencies and design boundaries of the particular application of my invention.

I claim:

1. A method of determining the unknown position of each of a plurality of points in space relative to the others of said plurality of points comprising the following elements:

Element 1. Establishing a wave station at each of said plurality of points in space;

Element 2. Providing a moving means for travel in continuously unknown motion relative to said unknown positions moving along a continuously unknown path with a continuously unknown velocity;

Element 3. Transmitting waves in the spaces between said wave stations and said means for travel;

Element 4. Using doppler measuring means generating the physical representations of quantities linearly dependent upon the variations of the simultaneously existing unknown and unmeasured distances between said wave stations and said means for travel;

Element 5. Feeding said physical representations into computing means;

Element 6. Using only said physical representations generated in Element 4 computing in said computing means the otherwise unknown position of each of said plurality of points in space relative to the others of said plurality of points in space.

2. A method as recited in claim 1 further defined in Element 4 in performing incremental type doppler measurements.

3. A method as recited in claim 1 further defined in Element 4 in using said doppler measuring means to perform rate type doppler measurements.

4. A method as recited in claim 1 further defined in Element 4 in using said doppler measuring means to measure changes in the distance between each said wave station and said means for travel.

5. A method as recited in claim 1 further defined in Element 4 in that said quantities are each proportional to the variation of the algebraic sum of the distance from a first wave station of said plurality of wave stations to said travelling means and the distance from a second wave station of said plurality of wave stations to said travelling means.

6. A method as recited in claim 1 further defined in Element 1 in that each of said wave stations is a wave transmitter, in Element 2 in that said means for travel including wave receiving means cooperative with said wave transmitters, in Element 3 in transmitting waves from said wave stations to said means for travel, in Element 4 comprising using said doppler means to determine the variations of the ranges from said means of travel to said wave stations, in Element 5 feeding the information derived in Element 4 into said computer, and in Element 6 computing simultaneously position data relative to said means for travel and the positions of said wave transmitters relative to one another.

7. A method as recited in claim 1 further defined in Element 1 in each of said wave stations comprising wave receiving means, in Element 2 in said means for travel including wave transmitting means cooperative with said wave receiving means, in Element 3 in employing said wave transmitting means to transmit waves from said means for travel to said wave stations, in Element 4 comprising using said doppler means to determine the variations of the ranges from said wave stations to said means for travel, in Element 5 feeding the information relative to said variations of the ranges derived in Element 4 into said computer, and in Element 6 computing simultaneously position data relative to said means of travel and the positions of said wave stations.

8. A method as recited in claim 1 further defined in Element 1 in at least one of said wave stations comprising wave transmitting means and in at least one of said wave stations comprising wave receiving means responsive to the waves transmitted by at least one of said wave transmitting means, in Element 2 providing wave reflecting means at said means for travel, in Element 3 transmitting waves to said means for travel from at least one of said wave stations and receiving waves from said means for travel at at least one of said wave stations, in Element 4 comprising using said doppler means to determine the variation of the two distances of each pair of a plurality of pairs of said simultaneous distances, each of said pairs comprising the distance between a transmitting means and said means for travel and the distance between a receiving means and said means for travel, Element 5 feeding the information derived in Element 4 into said computer, and in Element 6 computing simultaneously position data relative to said means for travel and the positions of said wave stations relative to one another.

9. A method of aerial ground surveying using radio means to determine the positions of a plurality of selected points on the ground comprising the following elements:

Element 1. Establishing at each said selected point a radio transmitter;

Element 2. Controlling the frequency of radio emanations from the transmitter by means of a frequency standard oscillator at the site of said selected point and the transmitter;

Element 3. Receiving simultaneously the signals of the several transmitters aboard an aircraft flying along an unknown path over the area of ground that is to be surveyed and upon which the transmitters have been established;

Element 4. Measuring quantities linearly related to the changes of the unknown and unmeasured ranges between said transmitters and the aircraft as the aircraft moves across the ground that is to be surveyed;

Element 5. Feeding said quantities into a computer;

Element 6. Computing in said computer the positions of the transmitters relative to one another.

10. A method as recited in claim 9 further defined in that a standard frequency oscillator is employed aboard said aircraft and further defined in using said standard frequency oscillator to measure said quantities aboard said aircraft.

11. A method as recited in claim 9 further defined in employing recording apparatus to record the signals from said transmitter and further defined in measuring said quantities after the flight of said aircraft using said recordings.

12. A method as recited in claim 9 further defined in carrying aboard said aircraft a standard frequency oscillator, using signals from said oscillator to detect in suitable receiving equipment the signals from said transmitters, recording aboard said aircraft the detected signals and further defined in subsequently employing the resultant recordings in the process of performing said measuring.

13. A method as recited in claim 9 further defined in carrying aboard said aircraft a standard frequency oscillator, using signals from said oscillator to perform said measuring aboard said aircraft and feeding the measured quantities into a computer aboard said aircraft for the performance of Element 6.

14. A method as recited in claim 9 further defined in carrying aboard said aircraft a standard frequency oscillator, using signals from said oscillator to perform said measuring aboard said aircraft, recording the measured quantities aboard said aircraft, and further defined in subsequently using said recordings to perform Element 5 at a point other than in said aircraft.

15. A method of determining simultaneously the position of a moving object relative to a plurality of simultaneously cooperating stations comprised by a multistatic measuring system and of determining the position of at least one of such stations without otherwise derived knowledge of any position occupied by said moving object before, during, or after the measurements used in the method and without any knowledge or measurement of angles, ranges or the sums or differences of simultaneous ranges comprising the following elements:

Element 1. Establishing at each of said stations wave communications means functional in automatically sensing the doppler phenomenon resultant of the variations of the distances of said moving object relative to said stations;

2. Employing the apparatus recited in Element 1 to measure the changes of quantities linearly related to the unknown and unmeasured distances between the positions of the moving object and the stations which the measurement system comprises;

3. Automatically introducing the data derived in Element 2 into automatic computing means;

4. Employing the data of the measurements of Element 2 computing in said automatic computing means the coordinates of the positions of the moving object and at least one of the stations which the system comprises employing in the computing of each coordinate so computed the measurements performed relative to all the stations of the multistatic measuring system.

16. A system for surveying the locations, relative to one another, of a plurality of stations, said system comprising transportation means whose position motion state is unknown comprising means cooperative simultaneously with a plurality of said stations, said system comprising the following elements:

Element 1. Wave means for sending wave signals in at least one direction between said stations and said transportation means as said transportation means moves along an unknown path at an unknown speed;

Element 2. Means for tracking said wave signals simultaneously;

Element 3. Means associated with said tracking means for measuring quantities linearly related to the variations of the unknown and unmeasured simultaneous distances between said stations and said transportation means;

Element 4. Means for feeding said quantities into computing means;

Element 5. Computing means responsive to Element 4 for computing dimensions of position of said stations, each computed dimension being dependent upon a plurality of said quantities.

17. A system as recited in claim 16 further defined in each of said stations comprising wave transmitting means, further defined in said transportation means comprising wave detecting means for detecting signals from said transmitting means, and further defined in said system comprising means for conducting the detected signals to Element 2.

18. A system as recited in claim 16 further defined in each of said stations comprising wave receiving means, further defined in said transportation means comprising wave transmitting means for sending signals to said stations to be detected by said wave receiving means, and further defined in said system comprising means for conducting the detected signals to Element 2.

19. A system as recited in claim 16 further defined in each of said stations comprising transponding means, further defined in said transportation means comprising wave transmitting means for sending signals to said stations to be transponded by said transponding means, and further defined in said transportation means comprising wave receiving means for detecting the signals from said transponding means, and further defined in said system comprising means for conducting the signals detected by said receiving means to Element 2.

20. A system as recited in claim 16 further defined in each of said stations comprising wave transmitting means transmitting signals to said transportation means, further defined in said transportation means comprising transponding means responsive to signals from said transmitting means and further defined in said stations comprising wave receiving means for detecting signals from said transponding means, and further defined in said system comprising means for conducting the signals detected by said receiving means to Element 2.

21. A system as recited in claim 16 further defined in said plurality of stations comprising wave transmitting means illuminating said transportation means, said transportation means being essentially a wave reflection means, further defined in said plurality of stations comprising wave receiving means for detecting signals reflected from said transportation means, and further defined in said system comprising means for conducting the signals detected by said receiving means to Element 2.

22. A system as recited in claim 16 further defined in Element 1 in each of said stations comprising standard frequency oscillator means employed in the functioning of said wave means.

23. A system as recited in claim 16 further defined in Element 3 in that said variations are rate type variations.

24. A system as recited in claim 16 further defined in Element 3 in that said variations are incremental type variations.

25. A system as recited in claim 16 further defined in Element 3 in that said quantities are each proportional to the variation of the range from one of said stations to one of said transportation means.

26. A system as recited in claim 16 further defined in that said transportation means is a single vehicle.

27. A system as recited in claim 16 further defined in that said transportation means is a plurality of vehicles functioning simultaneously in said system.

28. A system as recited in claim 16 further defined in Element 3 in that said quantities are each proportional to algebraic sum of the variations of the ranges from two of said stations to a unit of said transportation means.

29. A system as recited in claim 16 further defined in said computing means being remote from said transportation means.

30. A system as recited in claim 16 further defined in that Element 2, Element 3, Element 4, and Element 5 are remote from said transportation means.

31. A system as recited in claim 16 further defined in that said system is a radio system, further defined in that said transportation means in an aircraft, further defined in said system comprising a radio link between said aircraft and a remote point, and further defined in that the measurement information derived in Element 3 is transferred over said link as a part of Element 4, said computer being located at a point remote from said aircraft.

32. A system as recited in claim 16 further defined in Element 2 being digital means.

33. A system as recited in claim 16 further defined in said transportation means comprising a vehicle carrying recording means as well as means for receiving signals from said stations, said recording means recording the signals from said stations simultaneously, and further defined in Element 2 operating from the recordings provided by said recording means.

34. A system as recited in claim 16 further defined in said transportation means comprising a vehicle carrying recording means as well as receiving means for receiving signals from said stations, and further defined in said recording means being arranged to record the measurement output of Element 3, and further defined in Element 4 comprising means for operating from the recordings provided by said recording means.

35. A system as recited in claim 16 further defined in Element 1 in that said wave signals are ambiguous relative to the distances over which said signals are propagated.

36. A system as recited in claim 16 further defined in Element 1 in that said wave signals are unambiguous relative to the distances over which said signals are propagated.

37. A method of determining simultaneously and with common means the positions of each of a plurality of moving objects relative to stations comprised by a multistatic measuring system and of determining the positions of some of such stations without otherwise derived knowledge of any position occupied by the moving objects before, during or after the measurements used in the method and without any knowledge or measurement of angles, ranges or the sums or differences of simultaneous ranges comprising the following elements:

Element 1. Establishing at each of said stations wave communications means functional in automatically sensing the doppler phenomenon resultant of the variations of the distances of said moving objects relative to said stations;

Element 2. Employing the apparatus recited in Element 1 to automatically measure the rates of change of quantities linearly related to the distances between the positions of the moving objects and the stations which the measurement system comprises;

Element 3. Automatically introducing the data derived in Element 2 into automatic computing means;

Element 4. Computing with said automatic computing means the coordinates of the positions of the moving objects and the stations which the system comprises.

38. A method as recited in claim 1 further defined in that said method is a part of a Polystation Doppler method for detecting and tracking wave reflecting objects, such as missiles and the like, and further defined in Element 1 in that at least one of said waves stations comprises wave transmitting means and at least one of said wave stations comprises wave receiving means responsive to reflected signals transmitted by said transmitting means, and further defined in that said means for travel is a wave reflecting object; and further defined in illuminating said object using said wave transmitting means; and further defined in using said receiving means to receive the signals of said transmitting means reflected by said reflecting object; and further defined in employing the signals from said receiving means to perform Element 4.

39. A method as recited in claim 38 further defined in recording the signals from said receiving means, and further defined in employing the recordings of the signals from said receiving means so recorded in the performance of Element 4.

40. A method as recited in claim 1 further defined in that said points in space are in motion relative to each other and further defined in Element 6 in computing dimensions of the position-motion state of said points relative to one another.

41. A method as recited in claim 9 further defined in Element 1, in employing a continuous wave transmitter.

42. A method as recited in claim 9 further defined in Element 1 in employing a pulse type transmitter.

43. A method as recited in claim 9 further defined in Element 1 employing a transmitter broadcasting a wave with coded modulation.

44. A method as recited in claim 9 further defined in carrying aboard said aircraft a recording means and using said recording means to record aboard the aircraft while in flight the signals received simultaneously from the several transmitters, and further defined in subsequently employing the recordings provided by said recording means to perform Element 4.

45. A method as recited in claim 9 further defined in carrying aboard said aircraft a recording means and using said recording means to record aboard the aircraft while in flight the values of said measured quantities produced in Element 4 while the aircraft is in flight and further defined in employing the recordings provided by said recording means to perform Element 5 subsequent to the survey flight of the aircraft.

46. A method of mapping the Earth's surface comprising simultaneously determining the position of a moving vehicle relative to a plurality of ground points whose positions relative to one another and the vehicle are otherwise entirely unknown without otherwise derived knowledge of any position occupied by the vehicle and without any knowledge or measurement of angles, ranges, or the sums or differences of simultaneous ranges, comprising the following elements:

Element 1. Establishing at each of said ground points a wave transponder cooperative with wave means aboard said vehicle;

Element 2. Carrying aboard said vehicle wave transmission and reception means cooperative with said transponders simultaneously;

Element 3. Transmitting wave signals from said vehicle to said transponders simultaneously and receiving signals returned from said transponders to said vehicle simultaneously;

Element 4. Measuring the doppler effect on said returned signals caused by the variation of the unknown and unmeasured distances between said vehicle and said transponders as said vehicle moves at unknown speed along its unknown course;

Element 5. Employing the data derived in Element 4 in a computer to determine simultaneously the positions of said transponders relative to each other and relative to the vehicle.

47. A method as recited in claim 46 further defined in that in Element 4 the measuring of the doppler effect is accomplished by doppler measurements of the incremental type.

48. A method as recited in claim 46 further defined in that in Element 4 the measuring of the doppler effect is accomplished by doppler measurements of the rate type.

49. A method as recited in claim 46 further defined in that said vehicle is an aircraft, and further defined in that the signals returned by said transponders to the aircraft are received at the aircraft and recorded for later measurement in a computer.

* * * * *